United States Patent
Hayano

(10) Patent No.: US 9,986,123 B2
(45) Date of Patent: May 29, 2018

(54) INFORMATION PROCESSING APPARATUS, SYSTEM, AND METHOD FOR ACHIEVING EMBEDDING PROCESS CAPABLE OF ACCEPTING VARIOUS CONDITION SETTINGS

(71) Applicant: Hideaki Hayano, Kanagawa (JP)

(72) Inventor: Hideaki Hayano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days. days.

(21) Appl. No.: 15/305,406

(22) PCT Filed: May 7, 2015

(86) PCT No.: PCT/JP2015/063843
§ 371 (c)(1),
(2) Date: Oct. 20, 2016

(87) PCT Pub. No.: WO2015/174473
PCT Pub. Date: Nov. 19, 2015

(65) Prior Publication Data
US 2017/0134608 A1    May 11, 2017

(30) Foreign Application Priority Data
May 14, 2014   (JP) ................................. 2014-100518

(51) Int. Cl.
*H04N 1/00*   (2006.01)
*H04N 1/32*   (2006.01)
(Continued)

(52) U.S. Cl.
CPC ....... *H04N 1/32315* (2013.01); *G06F 3/1205* (2013.01); *G06F 3/1208* (2013.01);
(Continued)

(58) Field of Classification Search
None
See application file for complete search history.

(56) References Cited

U.S. PATENT DOCUMENTS 6,268,866 B1    7/2001  Shibata
7,227,661 B2 *  6/2007  Matsunoshita ....... G06T 1/0064
                                                       358/1.14
(Continued)

FOREIGN PATENT DOCUMENTS

JP    H11-008753   1/1999
JP    2001-117744  4/2001
(Continued)

OTHER PUBLICATIONS

Japanese Office Action for 2014-100518 dated Sep. 19, 2017.
(Continued)

*Primary Examiner* — Scott A Rogers
(74) *Attorney, Agent, or Firm* — IPUSA, PLLC

(57) ABSTRACT

There is provided an information processing apparatus comprising: a storage unit configured to store a plurality of process modules including a first process module for performing an embedding process by which information is embedded in image data; a setting unit configured to set a condition for performing the embedding process by the first process module; and a controlling unit configured to control a workflow in which one or more processes respectively performed by the process modules, including the first process module, are sequentially performed; wherein the first process module performs the embedding process under the set condition in response to detecting that image data input to the first process module in controlling the workflow is in a preset image format.

18 Claims, 22 Drawing Sheets

(51) Int. Cl.
 *G06F 3/12* (2006.01)
 *G06K 15/02* (2006.01)
 *G06K 15/00* (2006.01)
(52) U.S. Cl.
 CPC .......... *G06F 3/1238* (2013.01); *G06F 3/1241* (2013.01); *G06F 3/1253* (2013.01); *G06F 3/1273* (2013.01); *G06F 3/1275* (2013.01); *G06K 15/1856* (2013.01); *G06K 15/4095* (2013.01); *H04N 1/00228* (2013.01); *H04N 1/00344* (2013.01); *H04N 1/00949* (2013.01); *H04N 1/32144* (2013.01); *H04N 1/32229* (2013.01); *H04N 1/32336* (2013.01); *H04N 2201/0094* (2013.01)

(56) References Cited

U.S. PATENT DOCUMENTS

| | | | | |
|---|---|---|---|---|
| 7,889,884 | B2* | 2/2011 | Ihara | H04N 1/32144 |
| | | | | 358/1.1 |
| 7,999,973 | B2* | 8/2011 | Nakata | H04N 1/00867 |
| | | | | 283/113 |
| 8,194,289 | B2* | 6/2012 | Hosoda | G06T 1/0071 |
| | | | | 235/462.08 |
| 8,208,179 | B2* | 6/2012 | Ishikawa | H04N 1/32149 |
| | | | | 283/72 |
| 8,717,591 | B2* | 5/2014 | Yagishita | G06F 3/1222 |
| | | | | 358/1.13 |
| 2001/0030761 | A1* | 10/2001 | Ideyama | G06T 1/0028 |
| | | | | 358/1.9 |
| 2005/0134878 | A1* | 6/2005 | Ebuchi | G06F 3/1208 |
| | | | | 358/1.9 |
| 2005/0238205 | A1 | 10/2005 | Kimura et al. | |
| 2007/0177824 | A1 | 8/2007 | Cattrone et al. | |
| 2007/0229920 | A1* | 10/2007 | Fukushima | H04N 1/00795 |
| | | | | 358/488 |
| 2008/0018944 | A1 | 1/2008 | Morita | |
| 2008/0144115 | A1 | 6/2008 | Ishii | |
| 2008/0232640 | A1 | 9/2008 | Ishizu et al. | |
| 2009/0097075 | A1* | 4/2009 | Harada | H04N 1/00912 |
| | | | | 358/3.28 |
| 2009/0109458 | A1 | 4/2009 | Nagata | |
| 2009/0202103 | A1 | 8/2009 | Fujii et al. | |
| 2012/0250086 | A1* | 10/2012 | Imayoshi | H04N 1/00244 |
| | | | | 358/1.15 |
| 2012/0287456 | A1* | 11/2012 | Innami | H04N 1/00482 |
| | | | | 358/1.13 |
| 2013/0194628 | A1 | 8/2013 | Kamimoto | |

FOREIGN PATENT DOCUMENTS

| | | |
|---|---|---|
| JP | 2005-311766 | 11/2005 |
| JP | 2006-014191 | 1/2006 |
| JP | 2008-097493 | 4/2008 |
| JP | 2008-211716 | 9/2008 |
| JP | 2009-111904 | 5/2009 |
| JP | 2010-146216 | 7/2010 |
| JP | 2010-166166 | 7/2010 |
| JP | 2013-157860 | 8/2013 |

OTHER PUBLICATIONS

International Search Report dated Jun. 9, 2015 in PCT/JP2015/063843 filed on May 7, 2015.
Extended European Search Report for 15793337.5 dated Mar. 28, 2017.
Japanese Office Action for 2014-100518 dated Dec. 19, 2017.
Japanese Office Action for 2014-100518 dated Apr. 3, 2018.

* cited by examiner

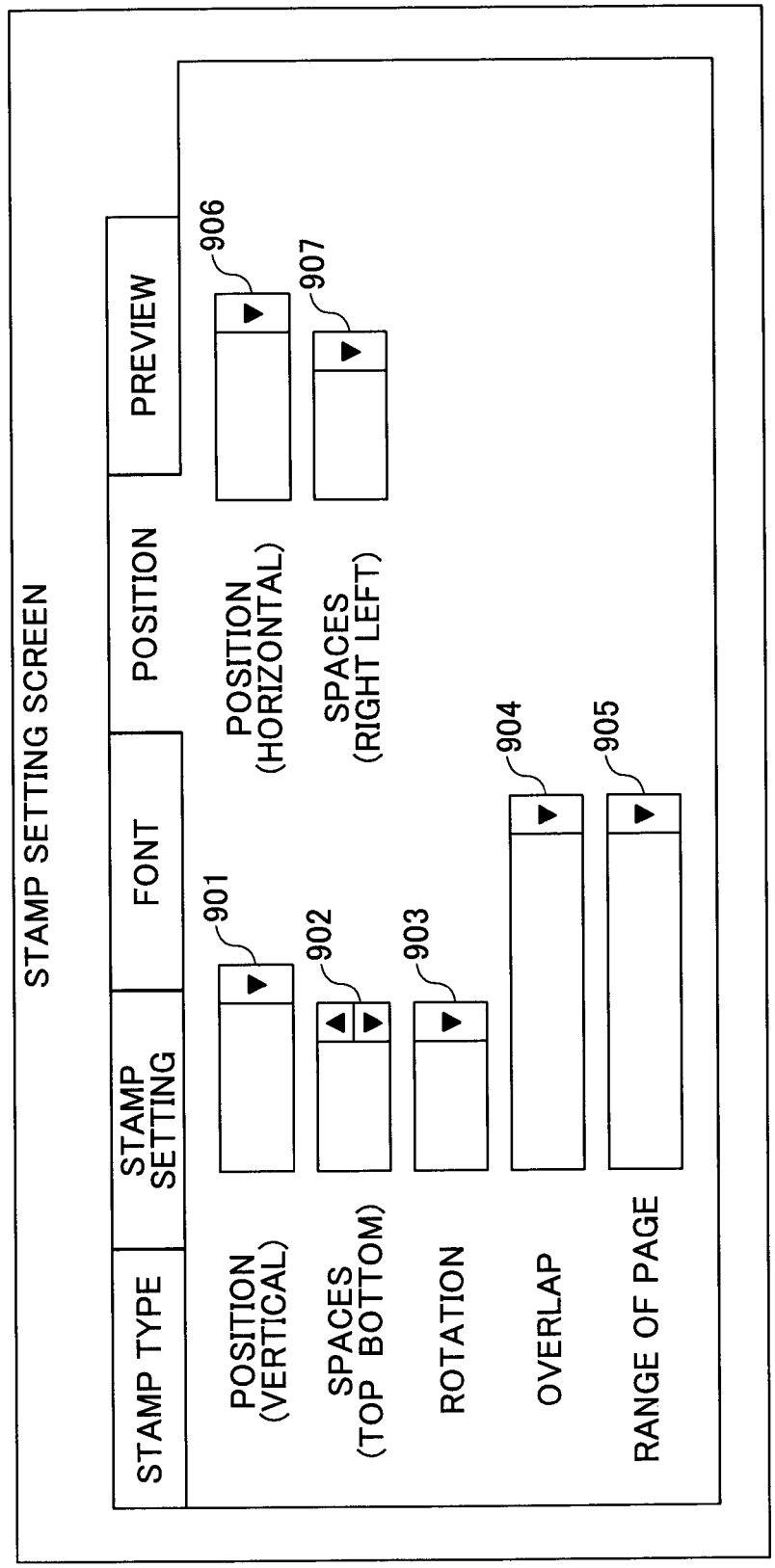

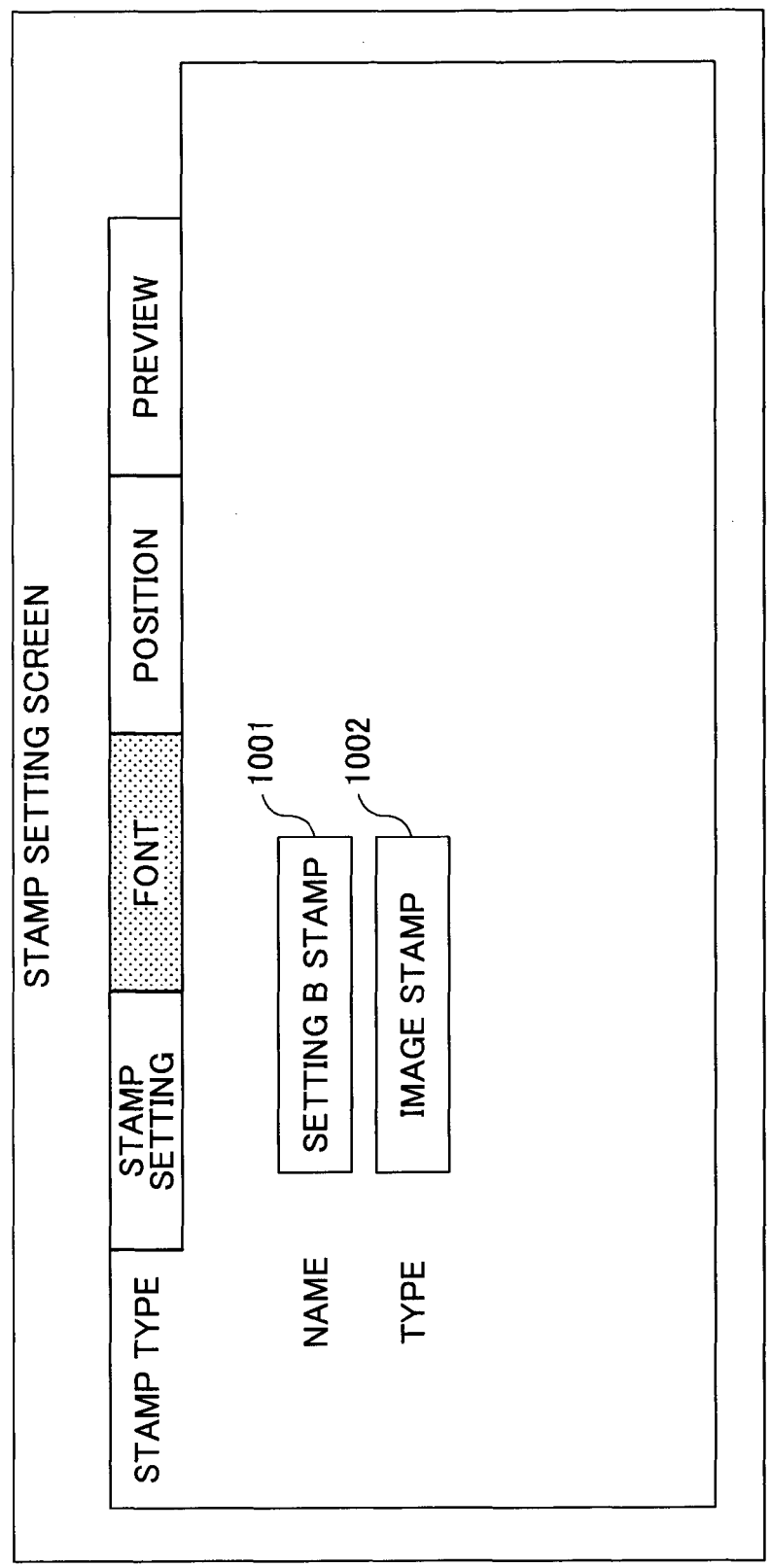

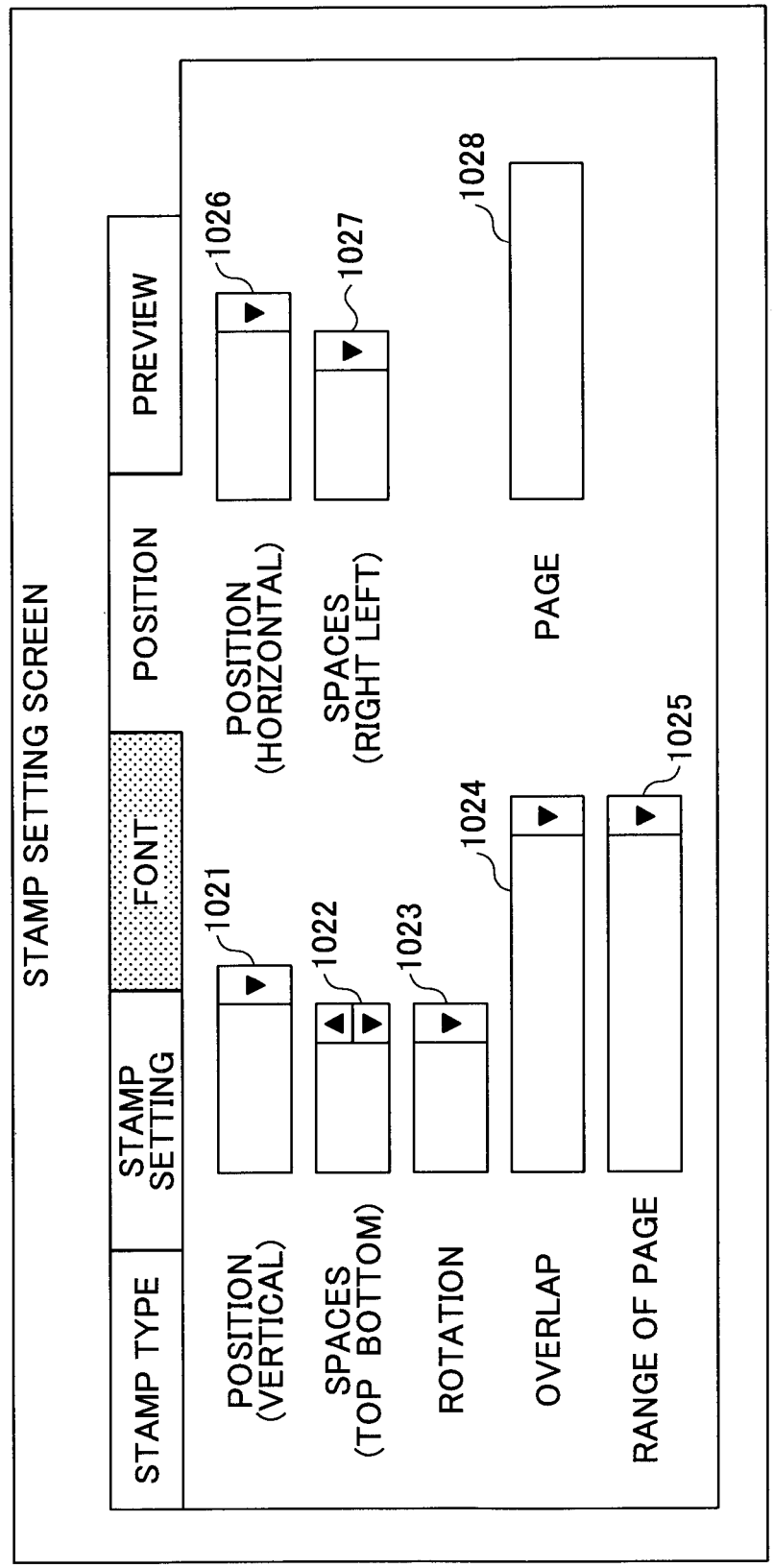

FIG.11

| STAMP NAME | STAMP TYPE | STAMP SETTING | FONT | POSITION | SIZE |
|---|---|---|---|---|---|
| SETTING A STAMP | COUNTER STAMP | START:1 END:9999 | FAMILY:Helvetica STYLE:Italic SIZE:30 COLOR:Red BACKGROUND:Orange BOUNDARY:Magenta THICKNESS:1 | VERTICAL:Top HORIZONTAL:Left RANGE:1~10 ROTATION:30 | A4 |
| SETTING B STAMP | IMAGE STAMP | IMAGE:XXX SCALE:10 | | VERTICAL:Top HORIZONTAL:Left RANGE:1~10 ROTATION:30 | A4 |
| SETTING C STAMP | TEXT WATERMARK STAMP | TEXT:YYY | FAMILY:Helvetica STYLE:Italic SIZE:30 COLOR:Red BACKGROUND:Orange BOUNDARY:Magenta THICKNESS:1 | CENTER FIX | A4 |
| SETTING D STAMP | IMAGE WATERMARK STAMP | IMAGE:XXX | | CENTER FIX | A4 |

1100

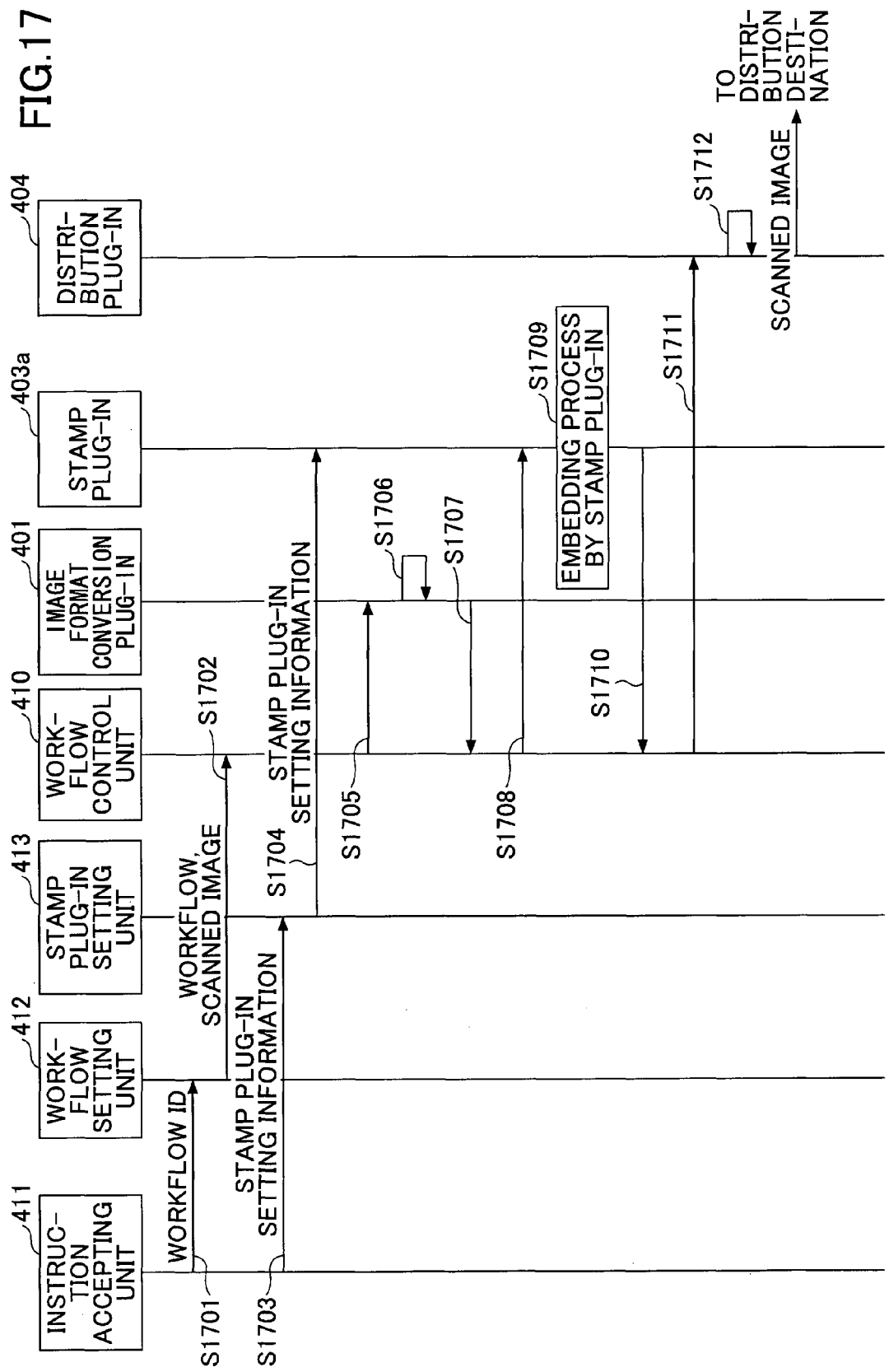

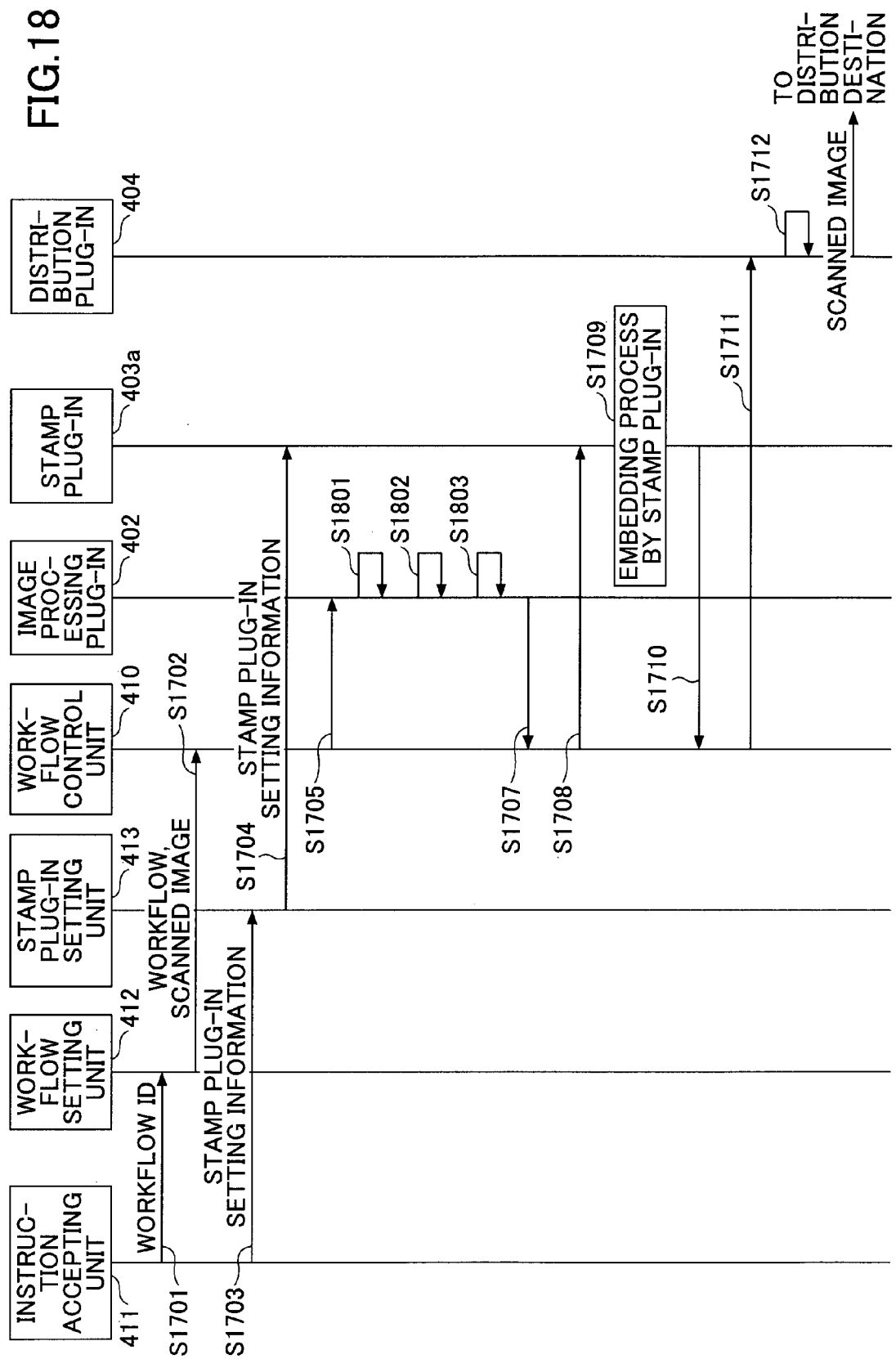

INFORMATION PROCESSING APPARATUS, SYSTEM, AND METHOD FOR ACHIEVING EMBEDDING PROCESS CAPABLE OF ACCEPTING VARIOUS CONDITION SETTINGS

TECHNICAL FIELD

The present technology relates to an information processing system, an information processing apparatus and an information processing method.

BACKGROUND ART

An information processing system has been known, in which a multifunctional peripheral and a distribution server are combined to distribute a scanned image generated by the multifunction peripheral by using the distribution server. According to the information processing system, for example, the distribution server performs a workflow process to perform certain image processing on the scanned image generated by scanning a document by the multifunction peripheral, thereby distributing it to an arbitrary destination. That is, the information processing system enables us to manage various documents in compliance with predetermined rules.

Meanwhile, recently, in view of copyright protection and the like, needs of an embedding process for embedding information such as copyright information in the scanned image is increasing. Therefore, the embedding process is required to be applied to the aforesaid information processing system.

In Japanese Laid-open Patent Publication No. 1999-008753, the embedding process for embedding a certain digital watermark in the scanned image is disclosed.

However, in a case where the embedding process is applied to such an information processing system, which handles the workflow where processes are sequentially performed, preferably, the embedding process should be performed as a selectable process of the processes sequentially performed.

Also, various needs of users respectively managing the various documents have to be taken into consideration.

RELATED ART DOCUMENT

Patent Document

[Patent Document 1]: Japanese Laid-open Patent Publication No. H11-008753

DISCLOSURE OF THE INVENTION

Problems to be Solved by the Invention

An object of disclosure of the present technology is to achieve an embedding process capable of accepting various condition settings according to user needs and flexibly performing the process according to the accepted condition settings in an information processing system which handles the workflow where processes are sequentially performed.

Means for Solving the Problems

According to an embodiment of the present invention, there is provided an information processing apparatus comprising: a storage unit configured to store a plurality of process modules including a first process module for performing an embedding process by which information is embedded in image data; a setting unit configured to set a condition for performing the embedding process by the first process module; and a controlling unit configured to control a workflow in which one or more processes respectively performed by the process modules, including the first process module, are sequentially performed; wherein the first process module performs the embedding process under the set condition in response to detecting that image data input to the first process module in controlling the workflow is in a preset image format.

Effects of the Present Invention

According to the disclosed technology, an embedding process capable of accepting various condition settings according to user needs and flexibly performing the process according to the accepted condition setting can be achieved in an information processing system which handles the workflow where processes are sequentially performed.

BRIEF DESCRIPTION OF THE DRAWINGS

FIG. 9A is a diagram for showing an example of the stamp setting screen in a case where counter stamp is selected to be embedded and "Position" is selected among the setting items;

FIG. 10A is a diagram for showing an example of the stamp setting screen where "Stamp Type" is selected among the setting items, and an image stamp is selected to be embedded;

FIG. 10C is a diagram for showing an example of the stamp setting screen in a case where the image stamp is selected to be embedded and "Position" is selected among the setting items;

FIG. 11 is a diagram for illustrating an example of stamp plug-in setting information;

FIG. 17 is a sequence diagram for illustrating a process of the workflow performance; and FIG. 18 is a sequence diagram for illustrating the process of the workflow performance in a case where the workflow having the workflow ID "5" is performed.

MODE FOR CARRYING OUT THE INVENTION

Figure 1:
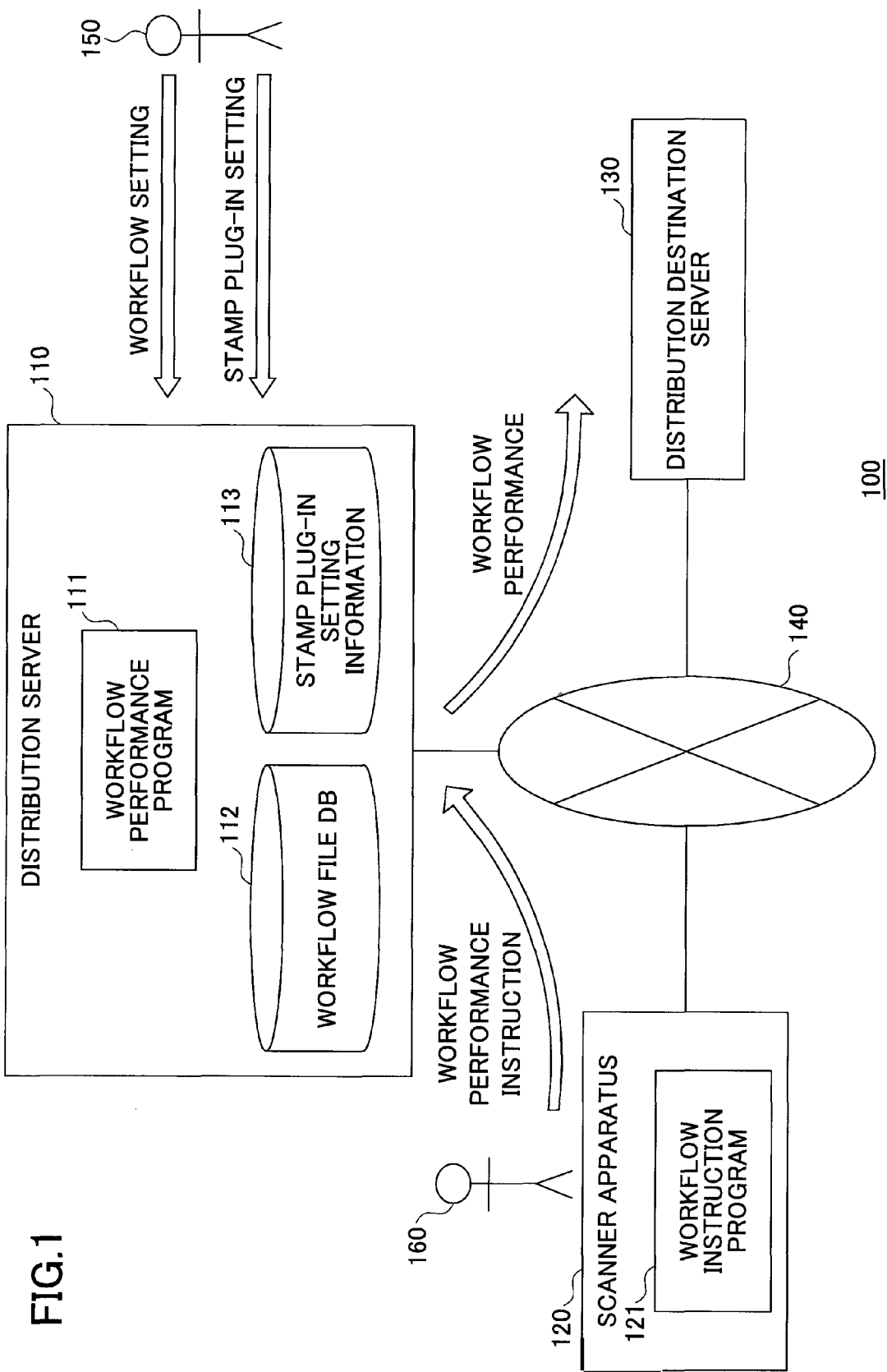
FIG. 1 is an illustration diagram for illustrating the overall configuration of an information processing system.

Herein below, the embodiments will be described with reference to accompanying drawings. Additionally, in the present specification and drawings, an identical reference numeral will be applied to elements or the like that have substantially similar functions and configurations, and duplicate descriptions thereof will be omitted.

First Embodiment

<1. Overall Configuration of Information Processing System>

First, an overall configuration of an information processing system will be described. FIG. 1 is an illustration diagram for illustrating the overall configuration of the information processing system 100.

As shown in FIG. 1, the information processing system 100 includes a distribution server 110 which is an example of an information processing apparatus, a scanner apparatus 120 which is an example of an image processing apparatus, and a distribution destination server 130. The distribution server 110, the scanner apparatus 120 and the distribution destination server 130 are connected with each other through a network 140.

The distribution server 110 includes a workflow performance program 111. The workflow performance program 111 performs processes of a workflow, supports setting of the workflow by an administrator 150, and supports setting of a stamp plug-in (described below) which constitutes a part of the workflow.

Also, the distribution server 110 includes a workflow file database (DB) 112 for storing a workflow set by the administrator 150, and a stamp plug-in setting information DB 113 for storing stamp plug-in setting information.

Additionally, the workflow means a processing procedure for performing one process or more in a desired sequence by combining a plurality of plug-ins. The workflow is selected by a user 160 using the scanner apparatus 120 and is performed by the workflow performance program 111 of the distribution server 110.

For example, by performing processes of the workflow by the workflow performance program 111, the distribution server 110 converts an image format of a scanned image sent from the scanner apparatus 120 and embeds a stamp in the scanned image, thereby distributing it to the distribution destination server 130. Additionally, the stamp means certain information is recorded/impressed (embedded) in an image.

The scanner apparatus 120 includes a workflow instruction program 121. The workflow instruction program 121 performs a process of workflow performance instruction. Specifically, the workflow instruction program 121 performs a process for supporting selection of a workflow by the user 160, or supporting input of setting information necessary for performing the processes of the selected workflow by the user 160. Also, the workflow instruction program 121 gives an instruction for performing the processes of the workflow selected by the user 160 based on the setting information, to the distribution server 110.

The distribution destination server 130 is an apparatus to which the scanned image from the distribution server 110 is distributed. The distribution destination server 130 may be configured as a file server, an EDMS (Enterprise Document Management System), a SMTP (Simple Mail Transfer Protocol) server, or the like.

Additionally, the destination of the scanned image distributed from the distribution server 110 is not limited to the distribution destination server 130. The scanned image can be distributed to any destination (including a certain storage area in the distribution server 110).

<2. Hardware Configuration of Distribution Server>

Figure 2:
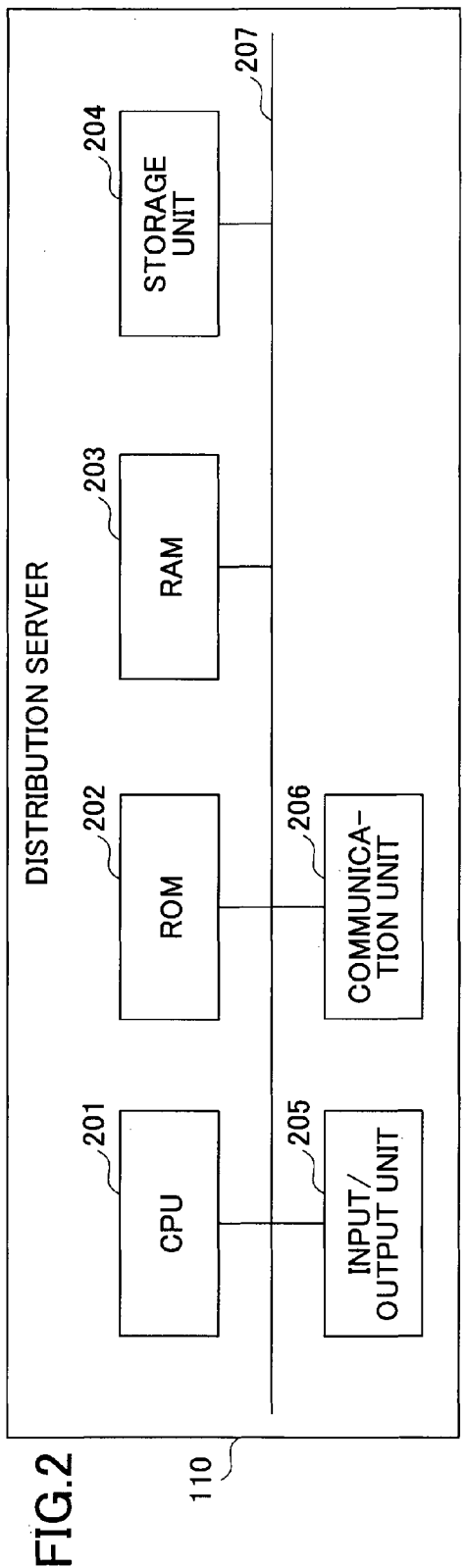
FIG. 2 is a block diagram for illustrating the hardware configuration of a distribution server.

In the following the hardware configuration of the distribution server 110 will be described. FIG. 2 is a block diagram for illustrating the hardware configuration of the distribution server 110.

As shown in FIG. 2, the distribution server 110 includes a CPU (Central Processing Unit) 201, a ROM (Read Only Memory) 202, a RAM (Random Access Memory) 203, and a storage unit 204. Further, the distribution server 110 includes an input/output unit 205, and a communication unit 206. Additionally, the respective units of the distribution server 110 are connected with each other through a bus 207.

The CPU 201 is a processor for executing programs stored in the storage unit 204.

The ROM 202 is a non-volatile memory. The ROM 202 stores programs or data necessary for executing the programs stored in the storage unit 204 by the CPU 201. Specifically, the ROM 202 stores boot programs such as BIOS (Basic Input/Output System) or EFI (Extensible Firmware Interface), and the like.

The RAM 203 is a main storage device, such as a DRAM (Dynamic Random Access Memory) or a SRAM (Static Random Access Memory). The RAM 203 serves as a working memory in which the programs are loaded when being executed by the CPU 201. The storage unit 204 stores the programs executed by the CPU 201.

The input/output unit 205 includes an input unit for inputting instructions for the distribution server 110, and a display unit for displaying screens generated by executing the workflow performance program in the distribution server 110. The communication unit 206 communicates with the scanner apparatus 120 and the distribution destination server 130 through the network 140.

<3. Hardware Configuration of Scanner Apparatus>

Figure 3:
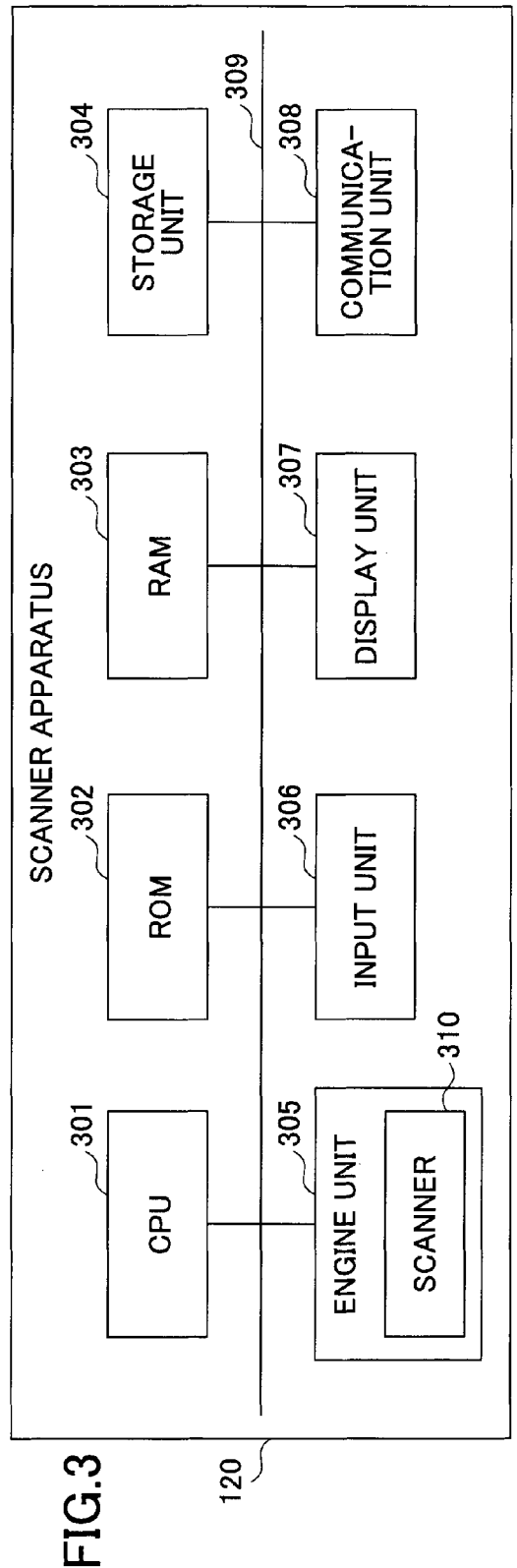
FIG. 3 is a block diagram for illustrating the hardware configuration of a scanner apparatus.

In the following, the hardware configuration of the scanner apparatus 120 will be described. FIG. 3 is a block diagram for illustrating the hardware configuration of the scanner apparatus 120.

As shown in FIG. 3, the scanner apparatus 120 includes a CPU (Central Processing Unit) 301, a ROM (Read Only Memory) 302, a RAM (Random Access Memory) 303, and a storage unit 304. Further, the scanner apparatus 120 includes an engine unit 305, an input unit 306, a display unit 307 and a communication unit 308. Additionally, the respective units of the scanner apparatus 120 are connected with each other through a bus 309.

The CPU 301 is a processor for executing programs stored in the storage unit 304.

The ROM 302 is a non-volatile memory. The ROM 302 stores programs or data necessary for executing the programs stored in the storage unit 304 by the CPU 301. Specifically, the ROM 302 stores boot programs such as BIOS (Basic Input/Output System) or EFI (Extensible Firmware Interface), and the like.

The RAM 303 is a main storage device, such as a DRAM (Dynamic Random Access Memory) or a SRAM (Static Random Access Memory). The RAM 303 serves as a working memory in which the programs are loaded when being executed by the CPU 301. The storage unit 304 stores the programs executed by the CPU 301.

The engine unit 305 includes a scanner 310 and generates a scanned image by scanning a document.

The input unit 306 accepts instructions for the scanner apparatus 120 from the user 160. Specifically, the input unit 306 accepts a selection of the workflow, or setting information necessary for performing the selected workflow. Also, the input unit 306 accepts an operation (pushing a start button) for sending an instruction to the distribution server 110 to perform the workflow.

The display unit 307 displays screens for selecting the workflow and inputting the setting information necessary for performing the selected workflow. The communication unit 308 communicates with the distribution server 110 through the network 140.

<4. Functional Configuration of Distribution Server>

Figure 4:
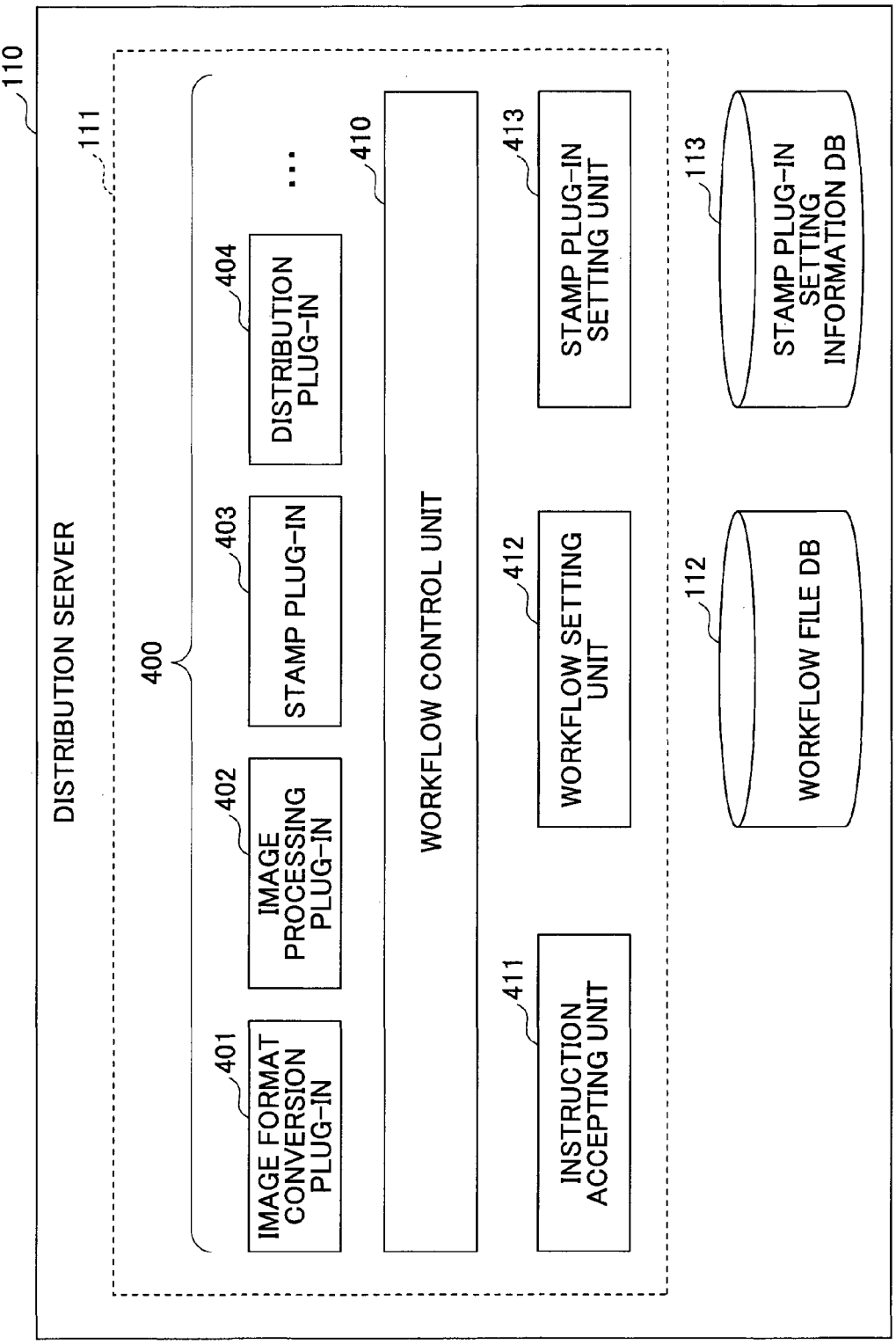
FIG. 4 is a block diagram for illustrating the functional configuration of a distribution server.

In the following, the functional configuration of the distribution server 110 will be described. FIG. 4 is a block diagram for illustrating the functional configuration of the distribution server 110.

As shown in FIG. 4, the distribution server 110 includes a plurality of plug-ins (process modules) 400, a workflow control unit 410, an instruction accepting unit 411, a workflow setting unit 412 and a stamp plug-in setting unit 413. These functional units included in the distribution server 110 are achieved, for example, by executing the workflow performance program 111 by the CPU 201.

Additionally, in the present embodiment, the plurality of plug-ins 400 include at least an image format conversion plug-in 401, an image processing plug-in 402, a stamp plug-in 403, and a distribution plug-in 404.

Also, for example, in the distribution server 110, the workflow file DB 112 and the stamp plug-in setting information DB 113 are disposed in the storage unit 204.

Among the plug-ins 400, the image format conversion plug-in 401 converts an image format (such as BMP, PDF or TIFF) of the scanned image into a certain image format. The image processing plug-in 402 performs various image processing (such as magnification/reduction, size collection, color correction or distortion correction) on the scanned image. Additionally, the image processing performed by the image processing plug-in 402 further includes top/bottom correction for correcting top and bottom of the scanned image, blank page elimination for eliminating blank pages in the scanned image, and inclination correction for correcting inclination of the scanned image.

The stamp plug-in 403 performs an embedding process for embedding certain information (stamp) in the scanned image. The stamp embedded by the stamp plug-in 403 includes a counter stamp by which values of a counter are embedded in the respective pages of the scanned image, and an image stamp by which an image such as a logo mark is embedded in the scanned image. Also, a text watermark stamp for embedding a character string such as "Confidential" as a watermark character string, and an image watermark stamp for embedding a watermark image are included.

Additionally, stamp plug-in setting information for defining conditions of the embedding process such as types of the stamp or the layout of the stamp in the scanned image is input in advance by the administrator 150 of the distribution server 110. A detailed description of input of the stamp plug-in setting information by the administrator 150 of the distribution server 110 will be given below.

The distribution plug-in 404 performs a distribution process for distributing the scanned image to the distribution destination server 130.

The workflow control unit 410 instructs execution of the plug-ins 400 in accordance with the workflow retrieved from the workflow file DB 122 by the workflow setting unit 412.

The instruction accepting unit 411 receives a workflow performance instruction from the scanner apparatus 120 and gives an instruction for the workflow control unit 410 to perform the workflow. Also, the instruction accepting unit 411 informs the workflow setting unit 412 of a workflow ID (identifier for identifying the workflow) included in the workflow performance instruction. Further, the instruction accepting unit 411 informs the stamp plug-in setting unit 413 of the stamp plug-in setting information included in the workflow performance instruction.

The workflow setting unit 412 retrieves the workflow, which is identified by the workflow ID informed by the instruction accepting unit 411, from the workflow file DB 112, thereby outputting it to the workflow control unit 410.

Also, the workflow setting unit 412, in response to a request from the scanner apparatus 120, sends a list of the workflows stored in the workflow file DB 112 to the scanner apparatus 120.

The workflow file DB 112 stores the workflows set by the administrator 150 of the distribution server 110 as workflow files.

The stamp plug-in setting unit 413 is used when the administrator 150 of the distribution server 110 inputs the stamp plug-in setting information of the stamp plug-in 403. Specifically, the stamp plug-in setting unit 413 displays a stamp setting screen for inputting the stamp plug-in setting information to accept input operation of the administrator 150 of the distribution server 110.

Also, the stamp plug-in unit 413, in response to a request from the scanner apparatus 120, sends the stamp setting screen to the scanner apparatus 120. Further, the stamp plug-in setting unit 413 outputs the stamp plug-in setting information for executing the stamp plug-in to the workflow control unit 410.

The stamp plug-in setting information DB 113 stores the stamp plug-in setting information accepted by the stamp plug-in setting unit 413.

<5. Workflow Setting Process and Workflow File>

Figure 5:
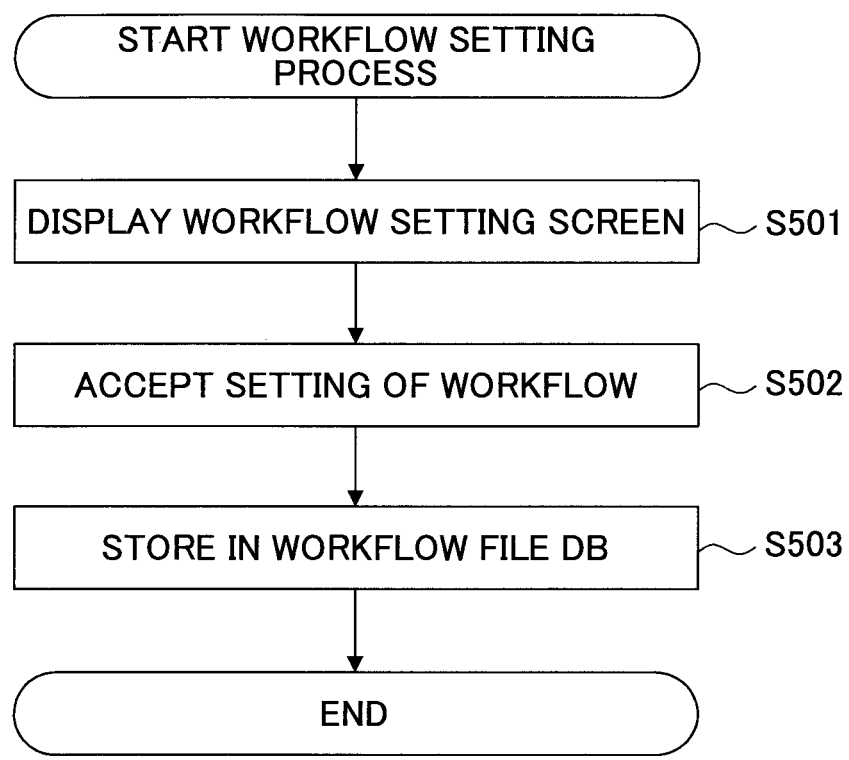
FIG. 5 is flowchart for illustrating the workflow setting process.

In the following, the workflow setting process performed by the workflow setting unit 412 will be described. FIG. 5 is flowchart for illustrating the workflow setting process performed by the workflow setting unit 412.

The workflow setting process, shown in FIG. 5, starts when the workflow setting unit 412 is activated. In step S501, the workflow setting unit 412 displays a workflow setting screen (not shown) on the display unit of the distribution server 110.

The administrator 150 of the distribution server 110 selects desired plug-ins from the plug-ins 400 to dispose them in a desired procedure sequence, thereby inputting the workflow. In step S502, the workflow setting unit 412 accepts the setting of the workflow input by the administrator 150 of the distribution server 110.

In step S503, the workflow setting unit 412 stores the setting of the workflow accepted in step S502 in the workflow file DB 112 as a workflow file.

Figure 6:
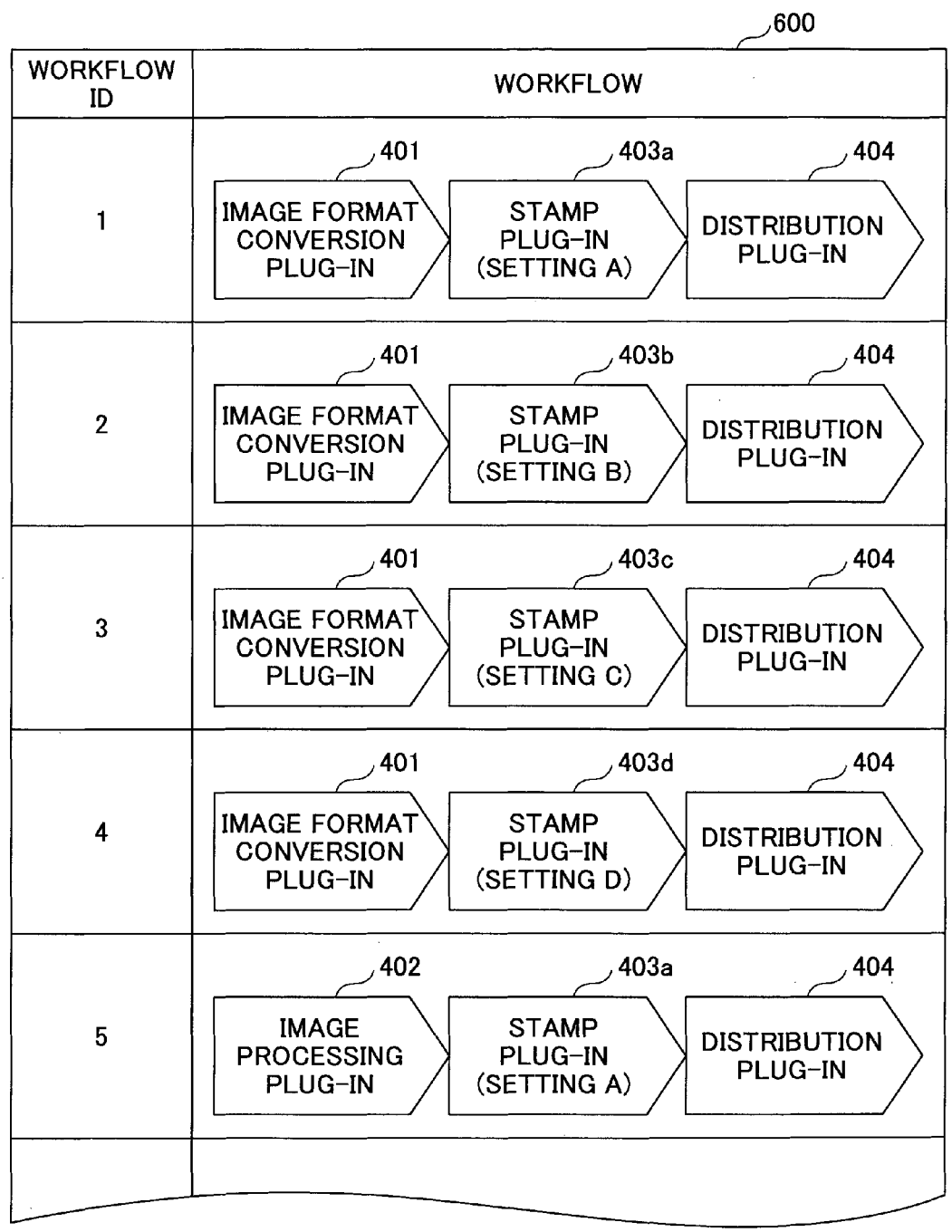
FIG. 6 is an illustration diagram for showing an example of the workflow file.

FIG. 6 is an illustration diagram for showing an example of the workflow file 600 stored in the workflow file DB 112. As shown in FIG. 6, items "Workflow ID" and "Workflow" are included in the workflow file 600.

The "Workflow ID" indicates an identifier for identifying the workflow set by the administrator 150 of the distribution server 110. The "Workflow" indicates the workflow (selected plug-ins) set by the administrator 150 of the distribution server 110.

In the workflow file 600 shown in FIG. 6, a workflow having the workflow ID "1" is set, in which the image format conversion plug-in 401, the stamp plug-in 403a and the distribution plug-in 404 are combined. The workflows having the workflow ID "2"-"4" are also set, where the plug-ins are similarly combined. However, different setting information is respectively set in the stamp plug-ins 403a-403d included in the respective workflows having the workflow ID "1"-"4".

Also, in the workflow file 600 shown in FIG. 6, a workflow having the workflow ID "5" is set, in which the image processing plug-in 402, the stamp plug-in 403a and the distribution plug-in 404 are combined.

That is, in the present embodiment, workflows having different combinations of the plug-ins 400 or having different setting information of the stamp plug-in sure stored in the workflow file 600.

<6. Stamp Plug-in Setting Process and Stamp Plug-in Setting Information>

Figure 7:
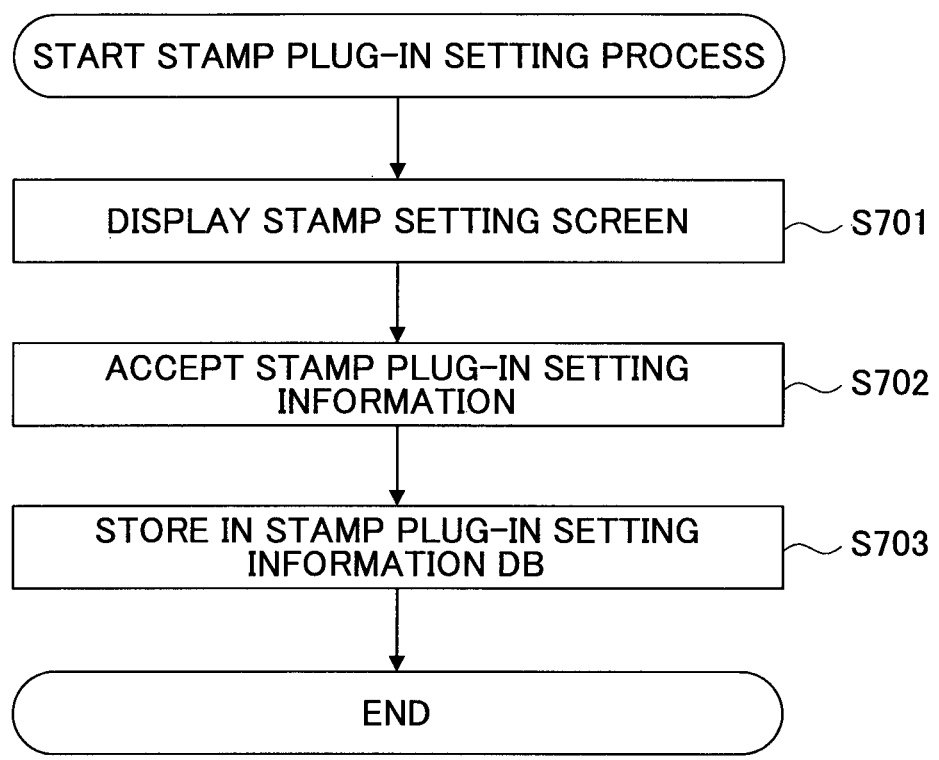
FIG. 7 is a flowchart for illustrating the stamp plug-in setting process.

In the following, a stamp plug-in setting process performed by the stamp plug-in setting unit 413 will be described with reference to FIG. 7-FIG. 10D. FIG. 7 is a flowchart for illustrating the stamp plug-in setting process performed by the stamp plug-in setting unit 413.

The stamp plug-in setting process, shown in FIG. 7, starts when the stamp plug-in setting unit 413 is activated. In step S701, the stamp plug-in setting unit 413 displays the stamp setting screen on the display unit of the distribution server 110.

In step S702, the stamp plug-in setting unit 413 accepts the stamp plug-in setting information input through an operation on the displayed stamp setting screen by the administrator 150 of the distribution server 110.

In step S703, the stamp plug-in setting unit 413 stores the stamp plug-in setting information accepted in step S702 in the stamp plug-in setting information DB 113.

In the following, an example of the stamp setting screen displayed in step S701 will be described. As shown in FIG. 8A to FIG. 10D, setting items "Stamp Type", "Stamp Setting", "Font", "Position" and "Preview" are included in the stamp setting screen, where the setting items are shown as tabs of the screen. Further detailed setting items are shown when selecting the respective tabs.

Figure 8A:
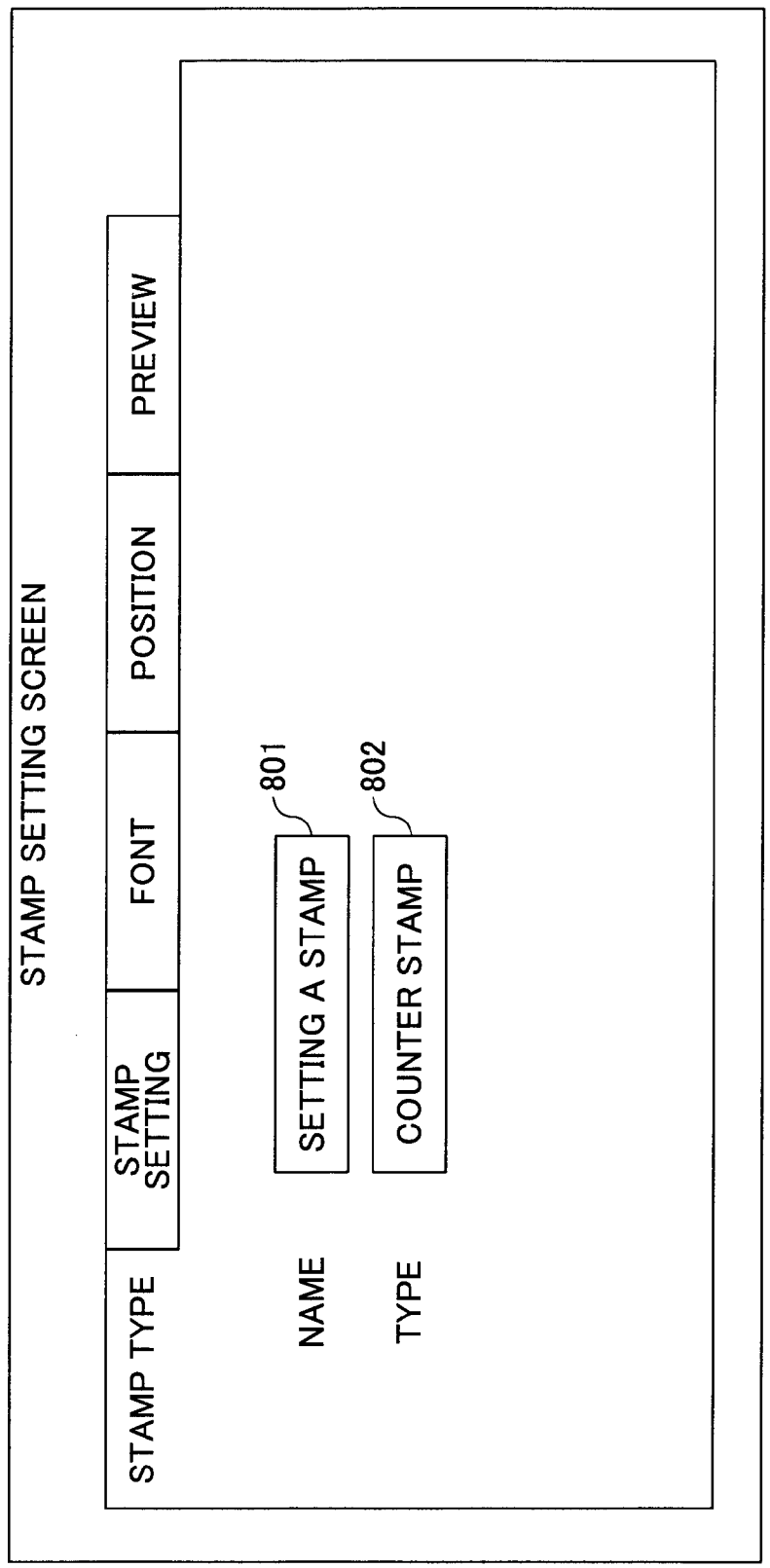
FIG. 8A is a diagram for showing an example of a stamp setting screen where the "Stamp Type" is selected among the setting items.

FIG. 8A is a diagram for showing an example of the stamp setting screen where the "Stamp Type" is selected among the setting items, and the counter stamp is selected in a field 802 to be embedded. Also, a name of a setting file of the stamp plug-in 403, in which the counter stamp is selected, "Setting A Stamp" is input in a field 801.

Figure 8B:
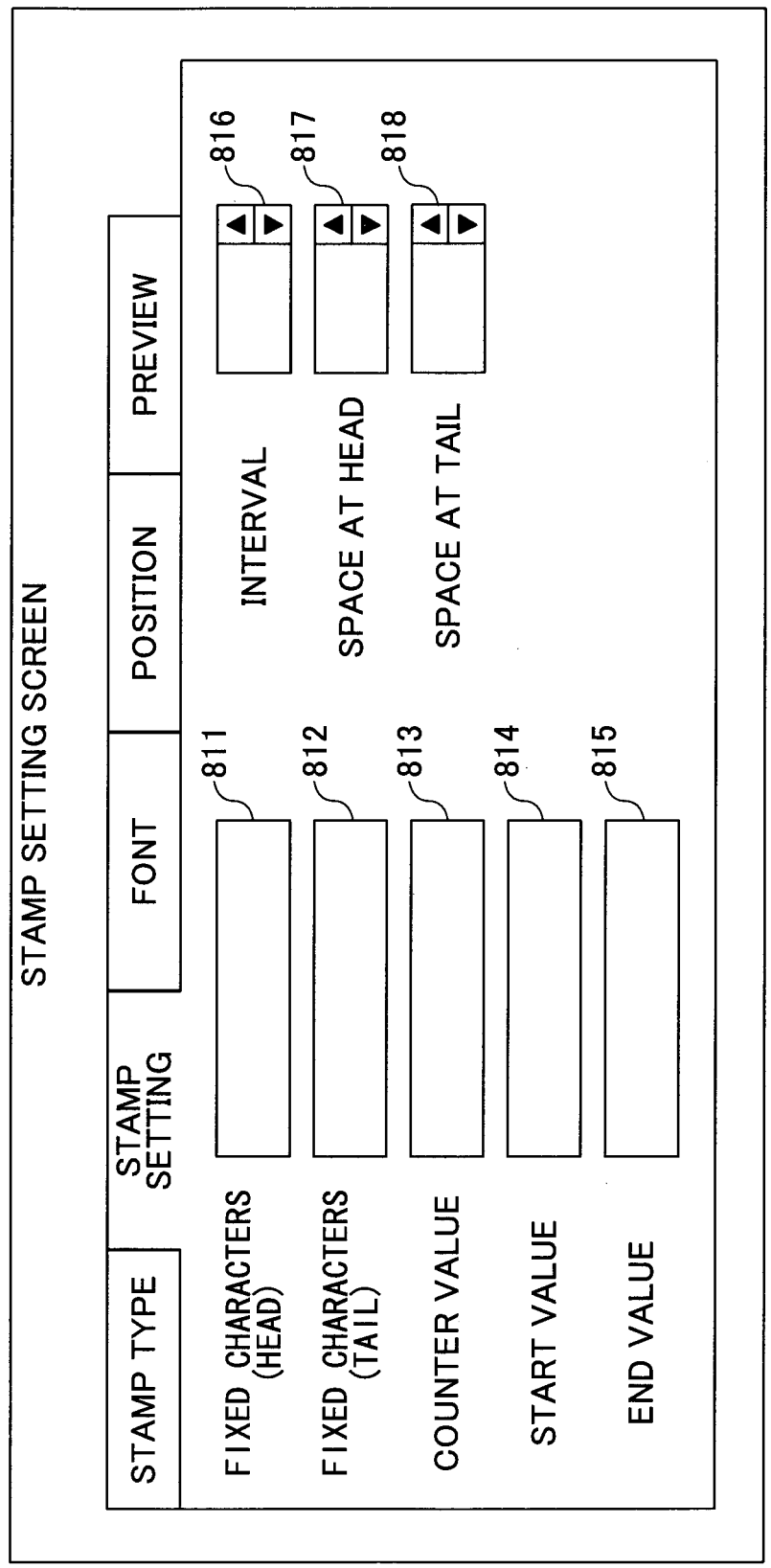
FIG. 8B is a diagram for showing an example of the stamp setting screen where the "Stamp Setting" is selected among the setting items.
Figure 8C:
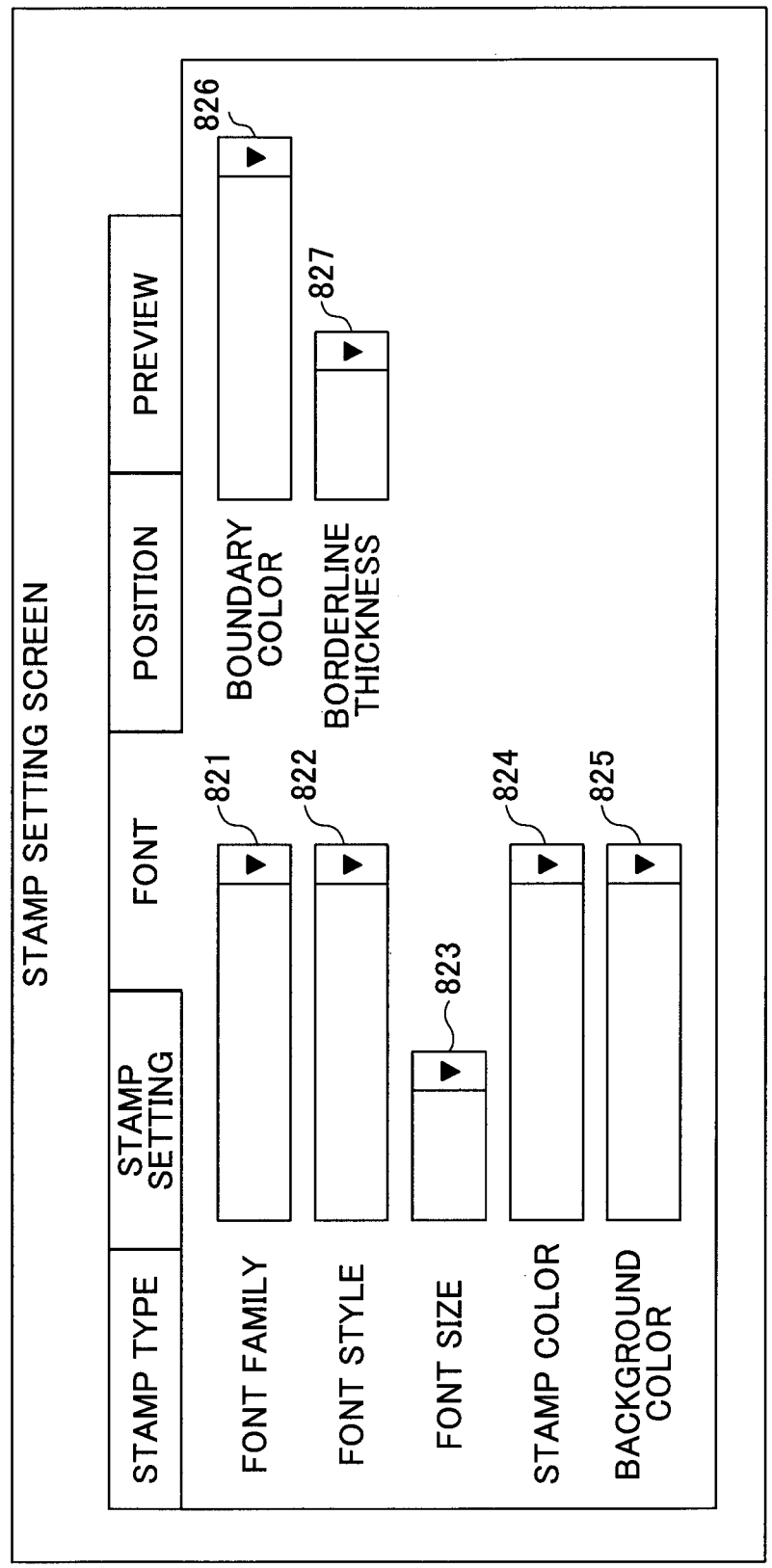
FIG. 8C is a diagram for showing an example of the stamp setting screen where the "Font" is selected among the setting items.

FIG. 8B is a diagram for showing an example of the stamp setting screen where the "Stamp Setting" is selected among the setting items and the counter stamp is selected to be embedded. FIG. 8C is a diagram for showing an example of the stamp setting screen where the "Font" (appearance of embedded stamp) is selected among the setting items and the counter stamp is selected to be embedded.

As shown in FIG. 8B, fixed characters input in a field 811 and field 812 can be embedded in the scanned image at a head of the counter value and a tail of the counter value by the counter stamp of the present embodiment. Additionally, a space between the counter value and the fixed character (at the head of the counter value) can be set by a value input in a field 817. Similarly, a space between the counter value and the fixed character (at the tail of the counter value) can be set by a value input in a field 818.

Also, the counter value counted by the counter stamp is shown in a field 813. The administrator 150 of the distribution server 110 can find the current counter value with reference to the field 813.

Additionally, the current counter value may be managed in every workflow or may be managed in every scanner apparatus. Also, the current counter value may be managed in every distribution server.

Further, a start value and end value of the counter can be set in fields 814 and 815. When selecting the counter stamp, the start value set in the field 814 is embedded in a top page of the scanned image, and counter values are subsequently embedded in the respective pages where the counter value is counted-up page by page. Additionally, when the counter value is counted-up to the end value set in the field 815, the start value set in the field 814 is embedded again. A count interval in counting-up the counter value is set in a field 816.

Also, as shown in FIG. 8C, font family, font style and font size can be set by inputting values in fields 821-823 when embedding the counter values in the scanned image by the counter stamp of the present embodiment.

Further, a color of the counter value embedded in the scanned image (stamp color), a color of area in the vicinity of the embedded counter value (background color), a color of a borderline around the embedded counter value (boundary color), and a thickness of the borderline (borderline thickness) can be set in fields 824-827.

Figure 9B:
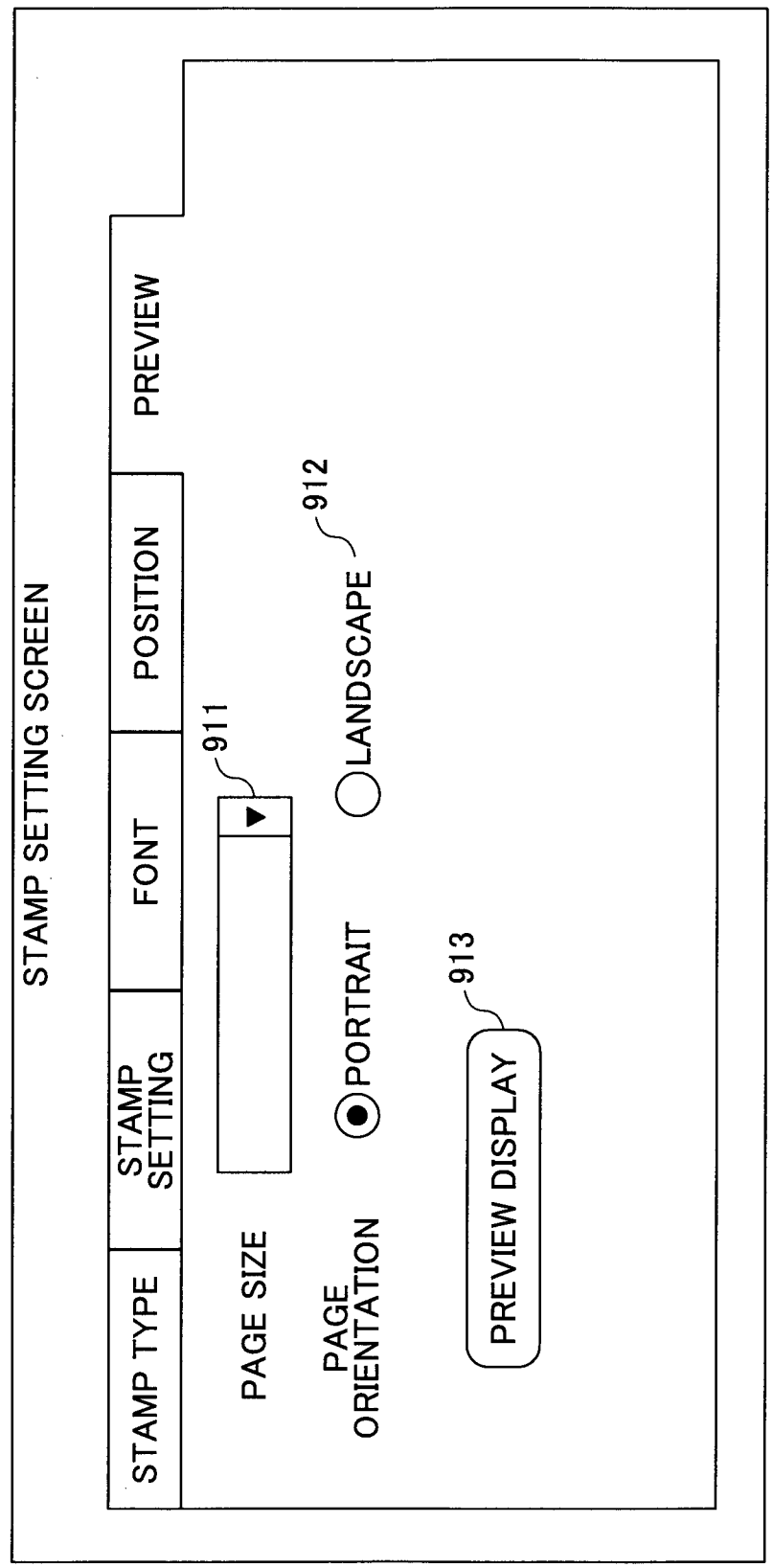
FIG. 9B is a diagram for showing an example of the stamp setting screen in a case where counter stamp is selected to be embedded and "Preview" is selected among the setting items.

FIG. 9A is a diagram for showing an example of the stamp setting screen in a case where the counter stamp is selected to be embedded and the "Position" is selected among the setting items. FIG. 9B is a diagram for showing an example of the stamp setting screen in a case where the counter stamp is selected to be embedded and the "Preview" (layout in the respective pages of the scanned image) is selected among the setting items.

As shown in FIG. 9A, a position (layout) of the embedded counter value in the scanned image can be set in the counter stamp of the present embodiment. Specifically, a position in vertical direction, a position in horizontal direction, spaces in top and bottom, spaces in right and left in the respective pages of the scanned image can be set in fields 901, 902, 906 and 907.

Also, the counter value can be embedded rotating with an angle set in a field 903 with respect to the scanned image. Further, the counter values can be embedded within a range of the page set in a field 905 among the respective pages of the scanned image.

Also, as shown in FIG. 9B, a page size of the scanned image can be set in a field 911 where the counter values are embedded in the scanned image by the counter stamp of the present embodiment. Further, a page orientation of the respective pages of the scanned image can be set in a field 912. Also, by pushing preview display button 913, the preview of the scanned image can be displayed where the counter values are embedded in accordance with the stamp plug-in setting information input through the stamp setting screen.

On the other hand, FIG. 10A is a diagram for showing an example of the stamp setting screen where the "Stamp Type" is selected among the setting items, and the image stamp is selected in a field 1002 to be embedded. Also, a name of a setting file of the stamp plug-in 403, in which the image stamp is selected, "Setting B Stamp" is input in a field 1001.

Figure 10B:
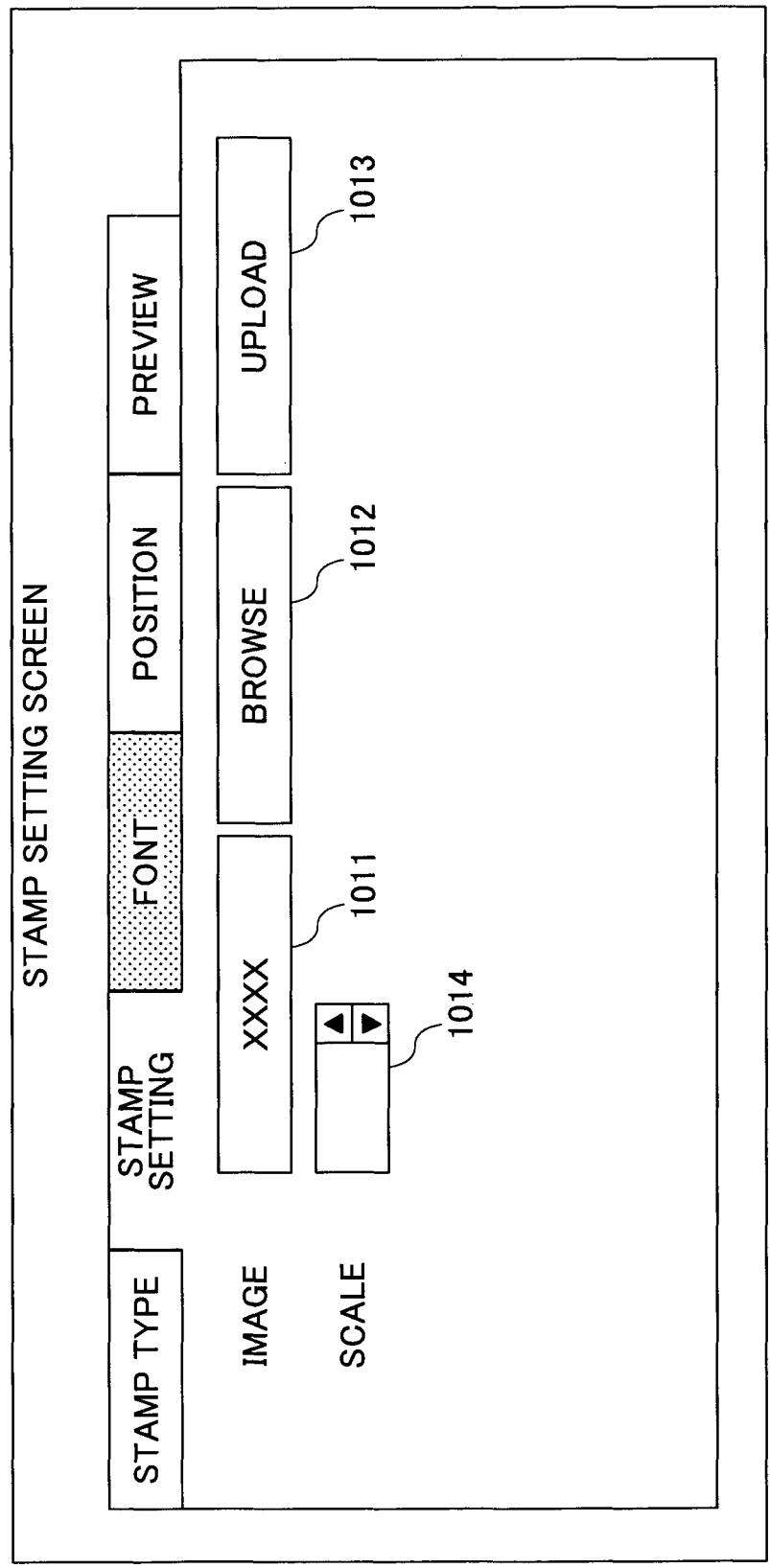
FIG. 10B is a diagram for showing an example of the stamp setting screen in a case where the image stamp is selected to be embedded and "Stamp Setting" is selected among the setting items.
Figure 10D:
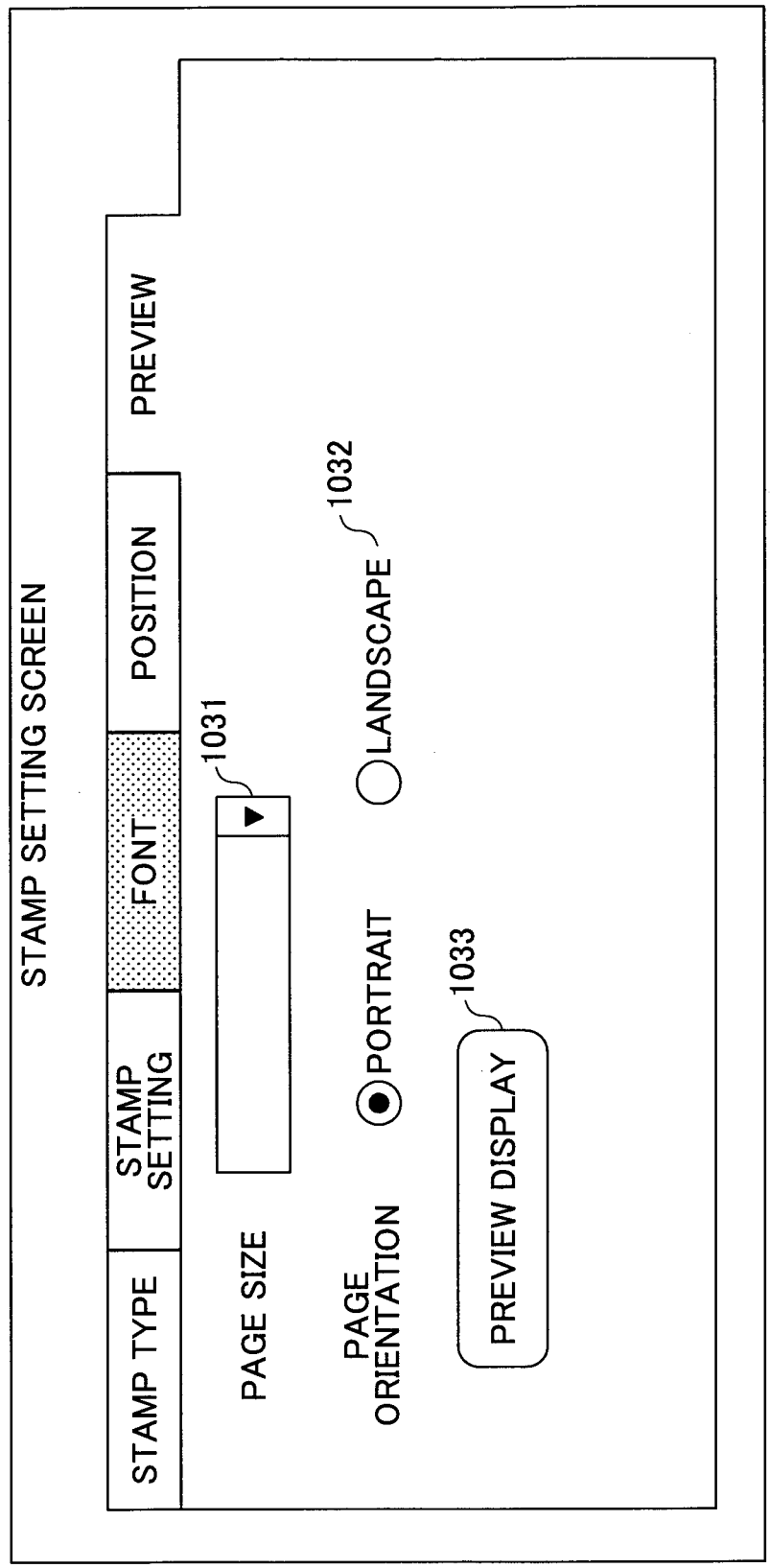
FIG. 10D is a diagram for showing an example of the stamp setting screen in a case where the image stamp is selected to be embedded and "Preview" is selected among the setting items.

FIG. 10B is a diagram for showing an example of the stamp setting screen in a case where the image stamp is selected to be embedded and the "Stamp Setting" is selected among the setting items. FIG. 10C is a diagram for showing an example of the stamp setting screen in a case where the image stamp is selected to be embedded and the "Position" is selected among the setting items. FIG. 10D is a diagram for showing an example of the stamp setting screen in a case where the image stamp is selected to be embedded and the "Preview" (layout in the respective pages of the scanned image) is selected among the setting items.

As shown in FIG. 10B, an image of the stamp to be embedded in the scanned image as the image stamp of the present embodiment can be designated by operation in a field 1011. A registered image stamp can be displayed by pushing a browse button 1012. Further, an arbitrary image can be registered as an image stamp by pushing an upload button. 1013, wherein the image format of the image to be registered as the image stamp shall be JPEG, BMP, PNG, or GIF.

Also, a scale of the image stamp designated in the field 1011 to be embedded in the scanned image can be set in field 1014. Additionally, an actual size of the image stamp, whose scale is set in the field 1014, may be determined in conjunction with the size of the scanned image in which the image stamp is embedded.

Also, as shown in FIG. 10C, a position (layout) of the stamp image of the present embodiment, which is embedded in the scanned image, can be set. Specifically, a position in vertical direction, a position in horizontal direction, spaces in top and bottom, spaces in right and left in the respective pages of the scanned image can be set in fields 1021, 1022, 1026 and 1027.

Also, the image stamp can be embedded rotated with an angle set in a field 1023 with respect to the scanned image. Further, the image stamp can be embedded within a range of the page set in a field 1025 among the respective pages of the scanned image. Or, the image stamp can be embedded only in pages designated in a field 1028 among the respective pages of the scanned image.

Also, as shown in FIG. 10D, a page size of the scanned image can be set in a field 1031 where the image stamp is embedded in the scanned image as the image stamp of the present embodiment. Further, a page orientation of the respective pages of the scanned image can be selected in a field 1032. Also, by a pushing preview display button 1033, the preview of the scanned image can be displayed where the image stamp is embedded in accordance with the stamp plug-in setting information input through the stamp setting screen.

Additionally, in the present embodiment, as well as the counter stamp and the image stamp, the text watermark stamp and the image watermark stamp can be selected. Setting information for the text watermark stamp and the image watermark stamp can also be set in the stamp setting screen similarly to the cases of the counter stamp and the image stamp. Therefore, the description of the stamp setting screen, in a case where the text watermark stamp or the image watermark stamp is selected to be embedded, is omitted.

FIG. 11 is a diagram for illustrating an example of the stamp plug-in setting information stored in the stamp plug-in setting information DB. The stamp plug-in setting information 1100 includes conditions for embedding process by the stamp plug-in 403 input by the administrator 150 of the distribution server 110 through the operation on the stamp setting screen such as shown in FIG. 8A to FIG. 10D.

Specifically, the stamp plug-in setting information 1100 includes items "Stamp Name", "Stamp Type", "Stamp Setting", "Font", "Position", and "Size".

Input value of the field 801 or 1001 of the stamp setting screen shown in FIG. 8A or FIG. 10A is described as the "Stamp Name". Selected value of the field 802 or 1002 of the stamp setting screen shown in FIG. 8A or FIG. 10A is described as the "Stamp Type".

Input values of the field 811-818, or 1011-1014 of the stamp setting screen shown in FIG. 8B or FIG. 10B are described as the "Stamp Setting".

Input values of the field 821-827 of the stamp setting screen shown in FIG. 8C are described as the "Font".

Input values of the field 901-907, or 1021-1028 of the stamp setting screen shown in FIG. 9A or FIG. 10C are described as the "Position".

Input value of the field 911 or 1031 of the stamp setting screen shown in FIG. 9B or FIG. 10D is described as the "Size".

<7. Embedding Process by Stamp Plug-in>

In the following, a process of workflow performance performed by the workflow control unit 410 will be described. Additionally, here, an entire process of the workflow stored in the workflow file 600 is not described, but details of an embedding process performed by the stamp plug-in 403 in the workflow are described.

Figure 12:
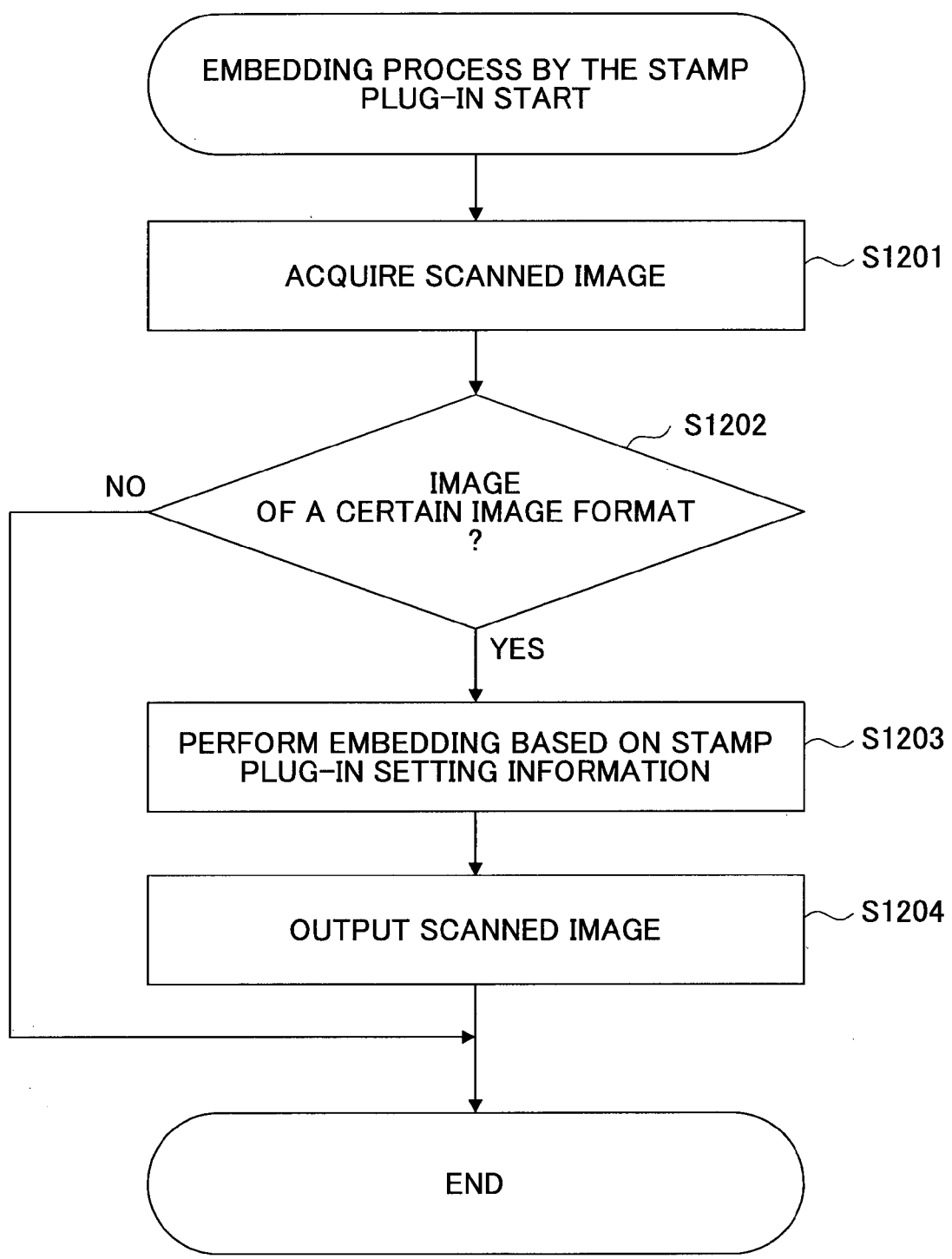
FIG. 12 is a flowchart for illustrating an embedding process.

In order to perform the workflow stored in the workflow file 600, the workflow control unit 410 gives an instruction to perform an image format conversion process by the image format conversion plug-in 401, or image processing by the image processing plug-in 402, on the scanned image. After performing the image format conversion process or the image processing in response to the instruction from the workflow control unit 410, the workflow control unit 410 gives an instruction to perform an embedding process by the stamp plug-in 403. Thus, the embedding process shown in FIG. 12 is started. FIG. 12 is a flowchart for illustrating the embedding process by the stamp plug-in 403.

In step S1201, the stamp plug-in 403 acquires the scanned image on which the image format conversion process or the image processing is performed by a plug-in (the image format conversion plug-in 401 or the image processing plug-in 402) located upstream in the workflow.

In step S1202, the stamp plug-in 403 determines whether the scanned image acquired in step S1201 is of a certain image format; that is, whether the image format of the acquired scanned image can be handled by the stamp plug-in 403 is determined. Additionally, in the present embodiment, the stamp plug-in 403 can handle the scanned image in an image format of BMP, PDF, or TIFF to perform the embedding process.

Therefore, in a case where the scanned image acquired in step S1201 is in an image format of BMP, PDF, or TIFF (YES, in S1202), the scanned image is determined as an image of a certain image format to proceed to step S1203.

In step S1203, the stamp plug-in 403 performs embedding based on the stamp plug-in setting information corresponding to the "Stamp Name" designated in the workflow. For example, in a case where the workflow having the workflow ID "1" is currently performed, the stamp plug-in 403a is executed based on the stamp plug-in setting information corresponding to "Setting A Stamp". Additionally, the stamp plug-in setting information corresponding to "Setting A Stamp" is shown in the stamp plug-in setting information 1100.

Meanwhile, in a case where the workflow having the workflow ID "2" is currently performed, the stamp plug-in 403b is executed based on the stamp plug-in setting information corresponding to "Setting B Stamp". Additionally, the stamp plug-in setting information corresponding to "Setting B Stamp" is shown in the stamp plug-in setting information 1100.

Further, when performing the embedding process, the stamp plug-in 403 also refers to the stamp plug-in setting information included in the workflow performance instruction (the stamp plug-in setting information input in the scanner apparatus 120).

In step S1204, the stamp plug-in 403 outputs the scanned image, on which the embedding process is performed, to a plug-in (distribution plug-in 404) located downstream in the workflow.

<8. Functional Configuration of Scanner Apparatus>

Figure 13:
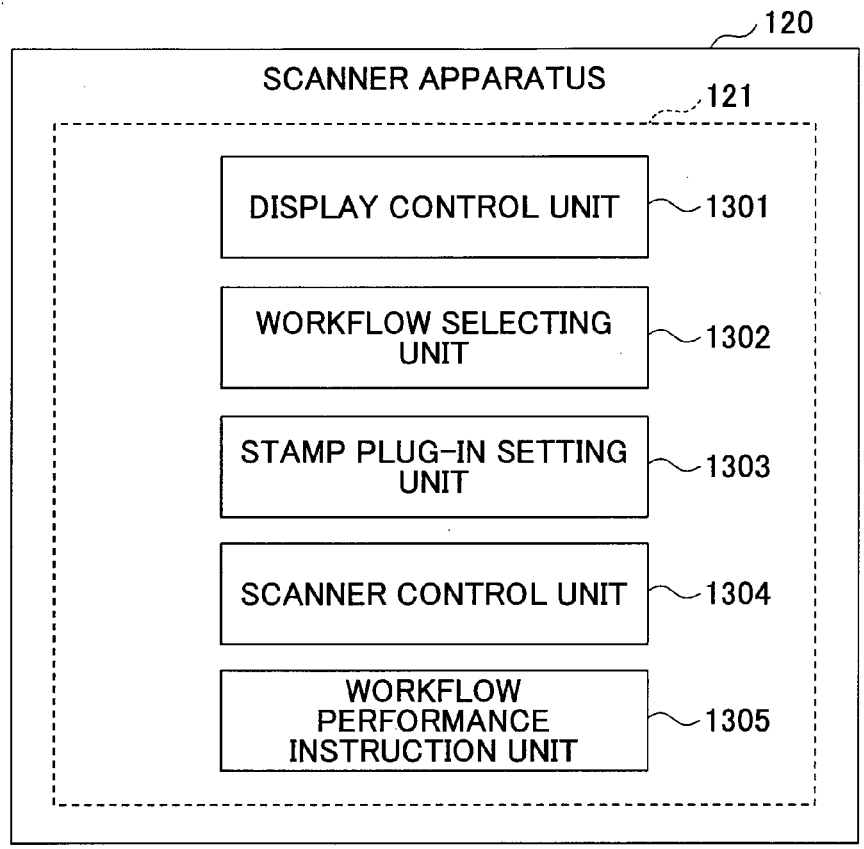
FIG. 13 is a block diagram for illustrating the functional configuration of a scanner apparatus.

In the following, the functional configuration of the scanner apparatus 120 will be described. FIG. 13 is a block diagram for illustrating the functional configuration of the scanner apparatus 120.

As shown in FIG. 13, the scanner apparatus 120 includes a display control unit 1301, a workflow selecting unit 1302, a stamp plug-in setting unit 1303, a scanner control unit 1304, and a workflow performance instruction unit 1305. For example, these functional units included in the scanner apparatus 120 are achieved by the CPU 301 executing the workflow instruction program 121.

The display control unit 1301 controls to display screens on the display unit 307 of the scanner apparatus 120.

The workflow selecting unit 1302 acquires a list of the workflows included in the distribution server 110, thereby gives the display control unit 1301 instruction to display it as a workflow selection screen 1400 (described below) for the user 160. The workflow selecting unit 1302 informs the workflow performance instruction unit 1305 of the workflow ID of the workflow selected by the user 160 from the displayed list of the workflows. Further, the workflow selecting unit 1302 gives the display control unit 1301 instruction to display a stamp setting screen 1500 (described below) for the stamp plug-in 403 included in the selected workflow for the user 160.

The stamp plug-in setting unit 1303 determines whether the stamp plug-in 403 for performing the embedding process is included in the workflow selected by the workflow selecting unit 1302 or not. In a case where the stamp plug-in 403 for performing the embedding process is included in the selected workflow, the stamp plug-in setting unit 1303 gives the display control unit 1301 instruction to display the stamp setting screen 1500 for the user 160. Also, the stamp plug-in setting unit 1303 acquires the stamp plug-in setting information input by the user 160 through an operation on the displayed stamp setting screen 1500. Further, the stamp plug-in setting unit 1303 informs the workflow performance instruction unit 1305 of the acquired stamp plug-in setting information. Additionally, the stamp plug-in setting information which can be input by the user 160 of the scanner apparatus 120 is predetermined and set when the stamp plug-in setting information is input by the administrator 150 of the distribution server 110.

Description is continued with reference to FIG. 13. The scanner control unit 1304 controls the scanner 310 to scan the document in response to pushing a start button by the user 160, thereby acquiring the scanned image generated by the scanner 310 Also, the scanner control unit 1304 outputs the acquired scanned image to the workflow performance instruction unit 1305.

The workflow performance instruction unit 1305 sends the workflow performance instruction to the instruction accepting unit 411 of the distribution server 110. Additionally, the workflow performance instruction includes at least the workflow ID of the workflow selected by the workflow selecting unit; the stamp plug-in setting information acquired by the stamp plug-in setting unit; and the scanned image acquired by the scanner control unit.

<9. Screen Displayed in Scanner Apparatus>

Figure 14:
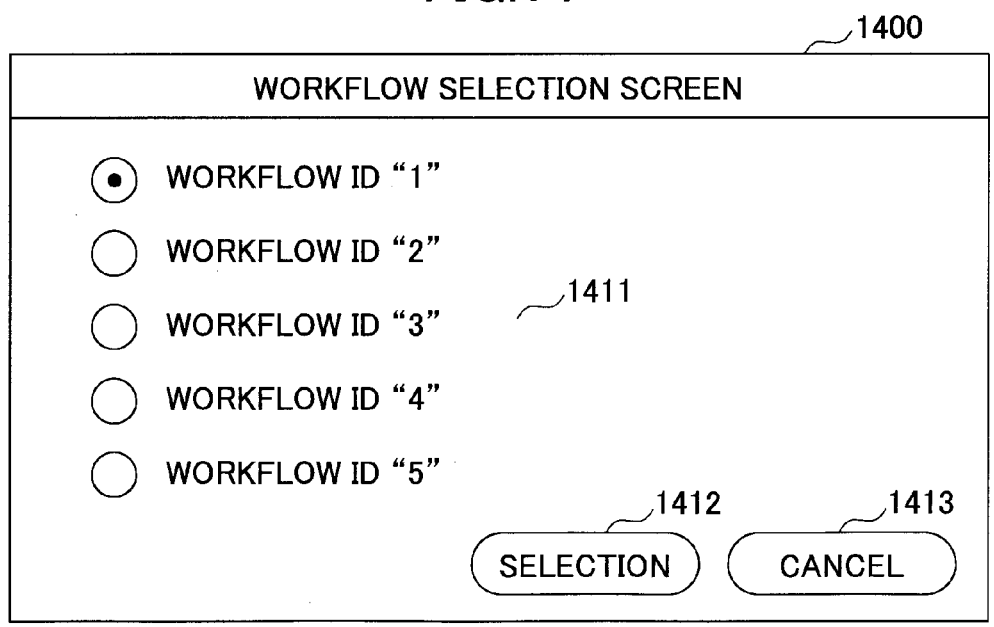
FIG. 14 is an illustration diagram of an example of a workflow selection screen.

In the following, screens displayed on the display unit 307 of the scanner apparatus 120 when processing the workflow performance instruction will be described. FIG. 14 is an illustration diagram of an example of a workflow selection screen 1400 displayed on the display unit 307 based on the instruction of the workflow selecting unit 1302 when processing the workflow performance instruction. As shown in FIG. 14, the workflow selection screen 1400 includes an area 1411 for displaying a list of the workflows included in the distribution server 110 with respective selection fields for selecting any one of the workflow from the list of the workflows.

As described above, in the information processing system 100 of the present embodiment, the user 160 can select an arbitrary workflow from the workflows respectively having different stamp plug-in setting information or different combinations of the plug-ins 400.

Also, a selection button 1412 for informing the workflow performance instruction unit 1305 of the workflow ID of the workflow selected by the user 160 is included in the workflow selection screen 1400. Additionally, in a case where the cancel button 1413 is pushed, the workflow selected by the user 160 is not reported to the workflow performance instruction unit 1305.

Figure 15:
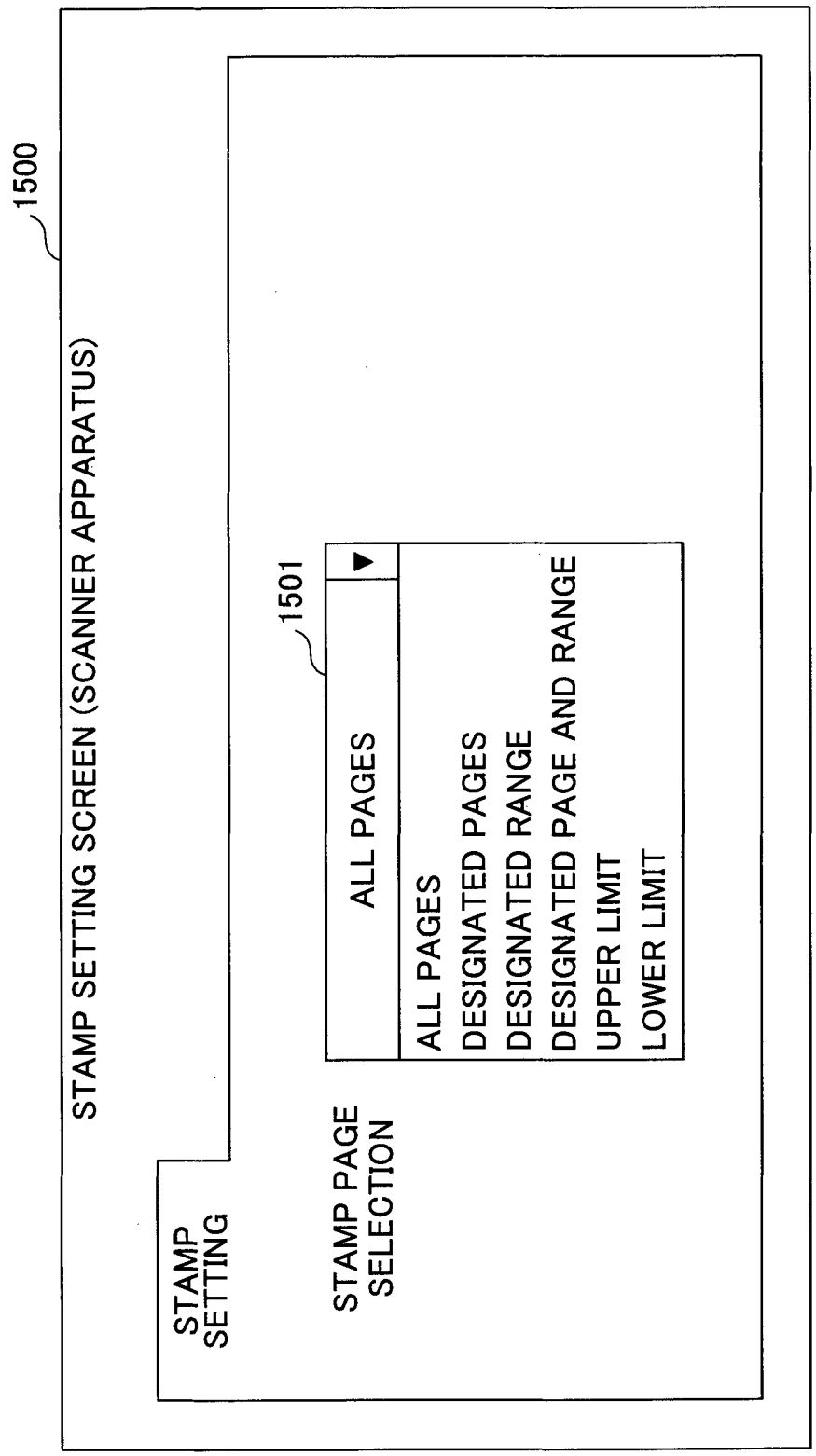
FIG. 15 is an illustration diagram of an example of a stamp setting screen of the scanner apparatus.

FIG. 15 is an illustration diagram of an example of a stamp setting screen displayed on the display unit 307 of the scanner apparatus 120 based on the instruction of the workflow selecting unit 1302. As shown in FIG. 15, a field 1501 for setting a range of pages where the embedding process is performed by the stamp plug-in 403 among the respective pages of the scanned image is included in the stamp setting screen 1500. Thus, the user 160 of the scanner apparatus 120 can set any range of the pages where the embedding process is performed in a case where the workflow including the stamp plug-in 403 is performed.

<10. Process of Information Processing System>

In the following, a process of the entire information processing system 100 will be described with reference to FIG. 16 and FIG. 17.

<10.1 Process of Workflow Performance Instruction>

First, a process of the workflow performance instruction in the information processing system 100 is described. FIG. 16 is a sequence diagram for illustrating the process of the workflow performance instruction in the information processing system 100.

Figure 16:
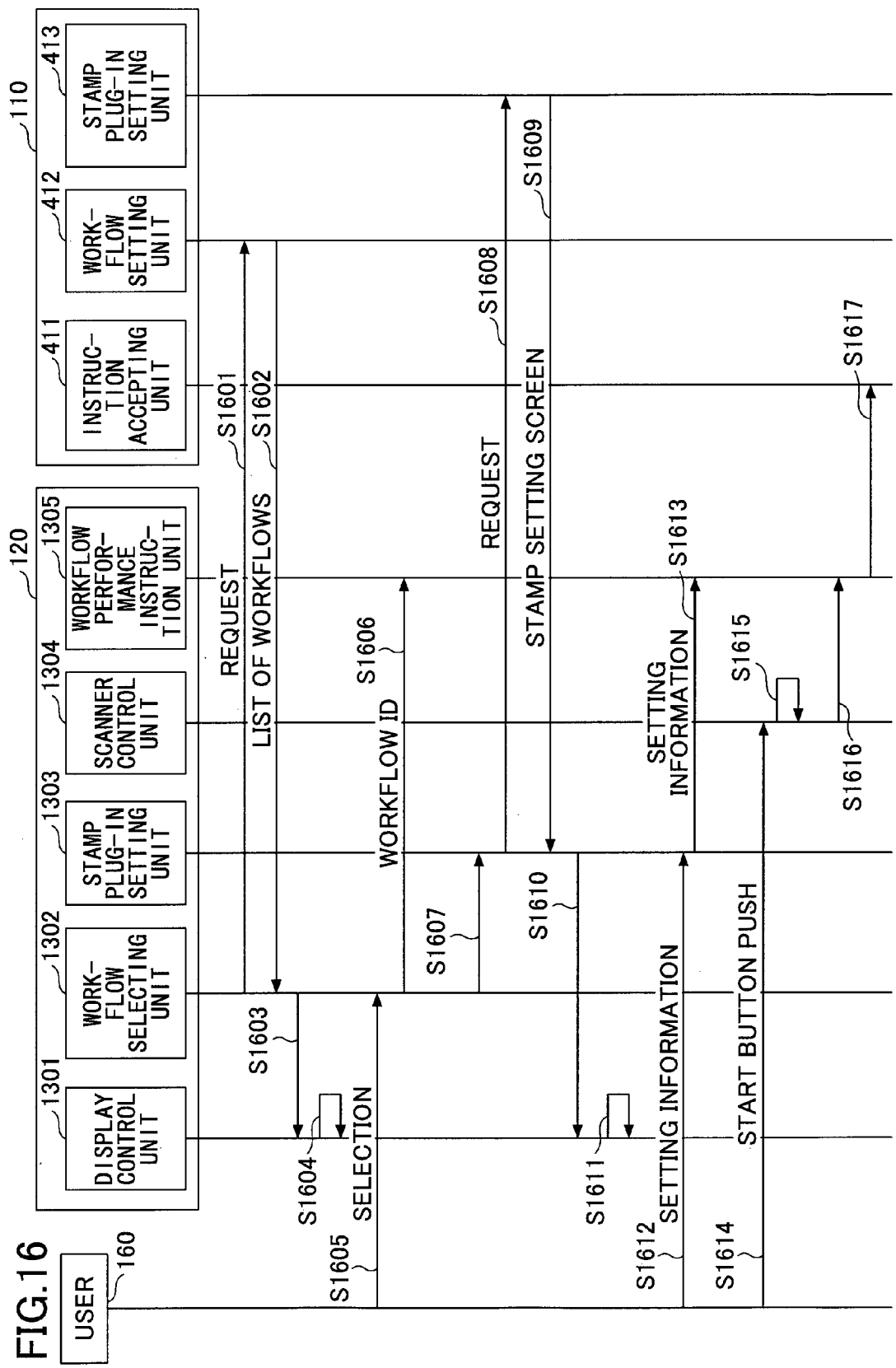
FIG. 16 is a sequence diagram for illustrating a process of the workflow performance instruction.

As shown in FIG. 16, in step S1601, the workflow selecting unit 1302 of the scanner apparatus 120 requests the workflow setting unit 412 of the distribution server 110 to send the list of the workflows.

In step S1602, the workflow setting unit 412 of the distribution server 110 sends the list of the workflows stored in the workflow file DB 112 in response to the request from the workflow selecting unit 1302.

In step S1603, the workflow selecting unit 1302 gives the display control unit 1301 the instruction to display the workflow selection screen 1400 in which the received list of the workflows are shown.

In step S1604, the display control unit 1301 displays the workflow selection screen 1400 on the display unit 307.

In step S1605, when the user selects a workflow (by checking the selection field and pushing the selection button 1412), the process is proceeded to step S1606.

In step S1606, the workflow selecting unit 1302 informs the workflow performance instruction unit 1305 of the workflow ID of the workflow selected in step S1605. Additionally, when the cancel button 1413 in the workflow selection screen 1400 is pushed the process is returned to step S1601.

In step S1607, the workflow selecting unit 1302 determines whether the stamp plug-in 403 is included in the selected workflow or not. When it is determined that the stamp plug-in 403 is included, the workflow selecting unit 1302 informs stamp plug-in setting unit 1303 of necessity of setting the stamp plug-in 403.

In step S1608, the stamp plug-in setting unit 1303 requests the stamp plug-in setting unit 413 to provide the stamp setting screen 1500. In step S1609, the stamp plug-in setting unit 413 provides the stamp plug-in setting unit 1303 with the stamp setting screen 1500 in response to the request.

In step S1610, the stamp plug-in setting unit 1303 gives the display control unit 1301 the instruction to display the stamp setting screen 1500. In step S1611, the display control unit 1301 displays the stamp setting screen 1500 on the display unit 307.

In step S1612, the user 160 inputs the stamp plug-in setting information which is accepted by the stamp plug-in setting unit 1303. Further, in step S1613, the stamp plug-in setting unit 1303 informs the workflow performance instruction unit 1305 of the stamp plug-in setting information.

In step S1614, the user 160 pushes the start button to instruct performing the workflow. In step S1615, the scanner control unit 1304 controls the scanner 310 to generate the scanned image, thereby acquiring the scanned image.

In step S1616, the scanner control unit 1304 outputs the acquired scanned image to the workflow performance instruction unit 1305.

In step S1617, the workflow performance instruction unit 1305 sends the workflow performance instruction to the instruction accepting unit 411 of the distribution server 110. The workflow performance instruction sent to the instruction accepting unit 411 includes the workflow ID informed in step S1606; the stamp plug-in setting information informed in step S1613; and the scanned image output in step S1616.

The distribution server 110 performs the workflow in accordance with the workflow performance instruction sent from the scanner apparatus 120.

<10.2 Process of Workflow Performance>

In the following, the process of the workflow performance of the information processing system 100 will be described. FIG. 17 is a sequence diagram for illustrating the process of the workflow performance of the information processing system 100.

When the instruction accepting unit 411 of the distribution server 110 receives the workflow performance instruction from the workflow performance instruction unit 1305 of the scanner apparatus 120, the process of the workflow performance shown in FIG. 17 starts.

In step S1701, the instruction accepting unit 411 informs the workflow setting unit 412 of the workflow ID included in the workflow performance instruction. In step S1702, the workflow setting unit 412 retrieves the workflow identified by the informed workflow ID from the workflow file DB 112 to send it with the scanned image included in the workflow performance instruction to the workflow control unit 410.

In step S1703, the instruction accepting unit 411 informs the stamp plug-in setting unit 413 of the stamp plug-in setting information included in the workflow performance instruction. In step S1704, the stamp plug-in setting unit 413 informs the stamp plug-in 403*a* of the stamp plug-in setting information.

In step S1705, the workflow controlling unit 410 sends the scanned image to the image format conversion plug-in 401 and outputs the instruction to perform the image format conversion. In step S1706, the image format conversion plug-in 401 performs the process of the image format conversion. Thus, the image format conversion is performed on the scanned image included in the workflow performance instruction received by the instruction accepting unit 411. In step S1707, the image format conversion plug-in 401 informs the workflow control unit 410 of the completion of the image format conversion.

In step S1708, the workflow control unit 410 sends the scanned image on which the image format conversion is performed to the stamp plug-in 403*a* and outputs the instruction to perform an embedding process. In step S1709, the stamp plug-in 403*a* performs the embedding process on the scanned image on which the image format conversion has been performed. The embedding process of the stamp plug-in 403*a* is performed based on the stamp plug-in setting information defined in the workflow according to the "Stamp Name" and the stamp plug-in setting information informed in step S1704. Additionally, since the embedding process performed by the stamp plug-in 403*a* has been already described with reference to FIG. 12, the detailed description is omitted.

In step S1710, the stamp plug-in 403*a* informs the workflow control unit 410 of the completion of the embedding process.

In step S1711, the workflow control unit 410 sends the scanned image on which the embedding process is performed to the distribution plug-in 404 and outputs the instruction to distribute. In step S1712, the distribution plug-in 404 distributes the scanned image on which the embedding process is performed to the distribution destination server 130.

<11. Summary>

As described above, in the distribution server 110 of the present embodiment, the embedding process is performed by the stamp plug-in so that the embedding process is performed as a part of the processes sequentially performed, in order to apply the embedding process to the information processing system handling the workflow in which the plurality of the processes are sequentially performed. At least four types of the stamp are prepared and the respective types of the stamp accept condition setting for the embedding process in the stamp plug-in, thereby handling various user needs for various document management. The image format of the scanned image processed by a plug-in located upstream is checked to perform the embedding process in a case where the scanned image is in a certain image format, thereby enabling the stamp plug-in to perform the embedding process as a part of the processes sequentially performed.

Thus, various user needs for various document management tasks can be handled. That is, the embedding process in accordance with the user needs can be achieved in the information processing system handling the workflow in which the plurality of the processes are sequentially performed.

Second Embodiment

In the first embodiment described above, the performance of the workflows having the workflow ID "1"-"4" is described with reference to FIG. 17. The performance of the workflow having the workflow ID "5" is described similarly.

FIG. 18 is a sequence diagram for illustrating the process of the workflow performance in the information processing system 100 in a case where the workflow having the workflow ID "5" is performed. Difference between FIG. 18 and FIG. 17 is the image processing performed by the image processing plug-in 402 (step S1801-S1803). Therefore, in the following, step S1801-S1803 will be described.

In step S1801, the image processing plug-in 402 performs the top/bottom correction on the scanned image included in the workflow performance instruction. In step S1802, the image processing plug-in 402 performs the blank page elimination on the scanned image on which the top/bottom correction has been performed. In step S1803, the image processing plug-in 402 performs the inclination correction on the scanned image on which the blank page elimination has been performed.

When the image processing is completed, the image processing plug-in 402 informs the workflow control unit 410 of the completion of the image processing. Then, the embedding process is performed by the stamp plug-in 403a on the scanned image on which the image processing has been performed.

As described above, according to the information processing system 100, the embedding process can be performed on the scanned image on which various processes have been performed.

Third Embodiment

Although in the first embodiment described above, the scanner apparatus 120 is included in the information processing system 100, this is not a limiting example. Instead of the scanner apparatus 120, any image processing apparatus such as facsimile apparatus, copier apparatus, or MFP (Multi-Function Peripheral) may be included in the information processing system 100.

Although, in the first embodiment described above, the description is given in a case where the scanned image is processed, this is not a limiting example. The embedding process may be performed on image data other than the scanned image.

Also, in the first embodiment described above, although the distribution server 110 and the scanner apparatus 120 are separately disposed and the scanned image generated by the scanner apparatus 120 is distributed by the distribution server 110, this is not a limiting example.

The functional units included in the distribution server 110 (functional units shown in FIG. 4) may be included in the scanner apparatus 120. In this case, the scanner apparatus 120 including the functional units of the distribution server 110 is an example of the information processing apparatus.

Herein above, although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth. The present application is based on Japanese Priority Application No. 2014-100518 filed on May 14, 2014, the entire contents of which are hereby incorporated herein by reference.

DESCRIPTION OF THE REFERENCE NUMERALS 100 information processing system
110 distribution server
111 workflow performance program
112 workflow file DB
113 stamp plug-in setting information DB
120 scanner apparatus
121 workflow instruction program
130 distribution destination server
400 plug-ins
401 image format conversion plug-in
402 image processing plug-in
403 stamp plug-in
404 distribution plug-in
410 workflow control unit
411 instruction accepting unit
413 stamp plug-in setting unit
600 workflow file
1100 stamp plug-in setting information

What is claimed is:
1. An information processing apparatus comprising:
a memory configured to store a plurality of process modules including a first process module for embedding information in image data; and
a processor coupled to the memory, the processor configured to
store, in the memory, one or more setting information items each indicating a condition for the first process module to embed the information in the image data, in association with identification information for identifying the one or more setting information items, respectively;
store workflow information representing the workflow in the memory, the workflow being formed by selecting process modules from the plurality of process modules including the first process module, in which the workflow information is stored in the memory in association with the identification information of a setting information item adapted in the workflow upon the workflow including the first process module; and
control processes respectively performed by the process modules included in the workflow in response to a workflow performance instruction of the workflow;
wherein upon the workflow including the first process module, the processor controls the processes respectively, by
specifying the workflow information of the workflow, the workflow information being stored in the memory, the workflow being indicated by the workflow performance instruction, specifying the setting information item in association with the identification information indicated by the workflow information of the workflow in the memory, and performing an embedding process using the first process module in accordance with the specified setting information.

2. The information processing apparatus as claimed in claim 1, wherein when storing the one or more setting information items, the processor sets in the condition for performing the embedding process any one of a counter stamp by which values of a counter, as embedded information, are embedded in pages of the image data, an image stamp by which a certain image, as the embedded information, is embedded in pages of the image data, and a watermark stamp by which a watermark character string or watermark image, as the embedded information, is embedded in pages of the image data.

3. The information processing apparatus as claimed in claim 2, wherein when storing the one or more setting information items, the processor further sets in the condition for performing the embedding process an appearance of embedded information and a layout of the embedded information in the pages of the image data.

4. The information processing apparatus as claimed in claim 2, wherein when storing the one or more setting information items, the processor further sets a page in the image data in which the embedded information is embedded.

5. The information processing apparatus as claimed in claim 2, wherein when storing the one or more setting information items, the processor further sets a start value and an end value of the counter of the counter stamp.

6. The information processing apparatus as claimed in claim 1, wherein a process module for converting the image format of the image data into the preset image format is disposed in the plurality of the process modules so that the image format conversion is performed before performing the embedding process by the first process module in the workflow.

7. The information processing apparatus as claimed in claim 1, wherein a second process module for performing top/bottom correction of the image data, blank page elimination in the image data, or inclination correction of the image data is disposed in the plurality of the process modules so that process of the second process module is performed before performing the embedding process by the first process module in the workflow.

8. An information processing system comprising:
an image processing apparatus; and
an information processing apparatus,
wherein the information processing apparatus includes
a first memory configured to store a plurality of process modules including a first process module for embedding information in image data; and
a first processor coupled to the first memory, the first processor configured to
store, in the first memory, one or more setting information items each indicating a condition for the first process module to embed the information in the image data in association with identification information for identifying the one or more setting information items, respectively;
store workflow information representing the workflow in the memory, the workflow being formed by selecting process modules from the plurality of process modules including the first process module, in which the workflow information is stored in the first memory in association with the identification information of a setting information item adapted in the workflow upon the workflow including the first process module;
control processes respectively performed by the process modules included in the workflow in response to a workflow performance instruction of the workflow; wherein upon the workflow including the first process module, the processor controls the first processes respectively, by
specifying the workflow information of the workflow, the workflow information being stored in the memory, the workflow being indicated by the workflow performance instruction,
specifying the setting information item in association with the identification information indicated by the workflow information of the workflow in the memory, and
performing an embedding process using the first process module in accordance with the specified setting information,
wherein the image processing apparatus includes
a second memory;
an image processing engine configured to generate the image data in the second memory; and
a second processor coupled to the second memory and the image processing engine, the second processor configured to
acquire an identifier for identifying a workflow selected by a user from workflows controlled by the first processor; and
send the workflow performance instruction including the image data and the acquired identifier to the information processing apparatus.

9. The information processing system as claimed in claim 8, wherein storing the one or more setting information items, the first processor sets in the condition for performing the embedding process any one of a counter stamp by which values of a counter, as embedded information, are embedded in pages of the image data, an image stamp by which a certain image, as the embedded information, is embedded in pages of the image data, and a watermark stamp by which a watermark character string or watermark image, as the embedded information, is embedded in pages of the image data.

10. The information processing system as claimed in claim 9, wherein storing the one or more setting information items, the first processor further sets in the condition for performing the embedding process an appearance of embedded information and a layout of the embedded information in the pages of the image data.

11. The information processing system as claimed in claim 9, wherein storing the one or more setting information items, the first processor further sets a page in the image data in which the embedded information is embedded.

12. The information processing system as claimed in claim 9, wherein storing the one or more setting information items, the first processor further sets a start value and an end value of the counter of the counter stamp.

13. The information processing system as claimed in claim 8, wherein a process module for converting the image format of the image data into the preset image format is disposed in the plurality of the process modules so that the image format conversion is performed before performing the embedding process by the first process module in the workflow.

14. The information processing system as claimed in claim 8, wherein a second process module for performing top/bottom correction of the image data, blank page elimination in the image data, or inclination correction of the image data is disposed in the plurality of the process modules so that process of the second process module is performed before performing the embedding process by the first process module in the workflow.

15. An information processing method of an information processing system including an image processing apparatus storing a plurality of process modules including a first process module which performs an embedding process for embedding information in an image data and an information processing apparatus, the method comprising:

storing, in a first memory at the information processing apparatus, one or more setting information items each indicating a condition for the first process module to embed the information in the image data in association with identification information for identifying the setting information item;

storing, in the first memory at the information processing apparatus, workflow information representing the workflow in the memory, the workflow being formed by selecting process modules from the plurality of process modules including the first process module, in which the workflow information is stored in the first memory in association with the identification information of a setting information item adapted in the workflow upon the workflow including the first process module;

controlling, by the information processing apparatus, processes respectively performed by the process modules included in the workflow in response to a workflow performance instruction of the workflow, wherein upon the workflow including the first process module, the information processing apparatus controls the processes respectively, by specifying the workflow information of the workflow, the workflow information being stored in the memory, the workflow being indicated by the workflow performance instruction, specifying the setting information item in association with the identification information indicated by the workflow information of the workflow in the memory, and performing an embedding process using the first process module in accordance with the specified setting information;

acquiring, by the image processing apparatus, an identifier for identifying a workflow selected by a user from workflows controlled by the controlling unit, by the image processing apparatus; and sending, by the image processing apparatus, the workflow performance instruction including an image data generated by scanning a document and the acquired identifier to the information processing apparatus.

16. The information processing apparatus as claimed in claim 1, wherein upon the workflow including the first process module, when specifying the setting information item, the processor determines whether an image format of the acquired image data can be handled by the first process module, and specifies the setting information item in association with the identification information indicated by the workflow information of the workflow in the memory, and performs an embedding process using the first process module, with respect to the acquired image data of which the image format can be handled by the first process module.

17. The information processing system as claimed in claim 8, wherein upon the workflow including the first process module, when specifying the setting information item, the first processor determines whether an image format of the acquired image data can be handled by the first process module, and specifies the setting information item in association with the identification information indicated by the workflow information of the workflow stored in the first memory, and performs an embedding process using the first process module, with respect to the acquired image data of which the image format can be handled by the first process module.

18. The information processing method as claimed in claim 15, wherein upon the workflow including the first process module, when specifying the setting information item, the information processing apparatus determines whether an image format of the acquired image data can be handled by the first process module, and specifies the setting information item in association with the identification information indicated by the workflow information of the workflow stored in the first memory, and performs an embedding process using the first process module, with respect to the acquired image data of which the image format can be handled by the first process module.

* * * * *